United States Patent
Chen et al.

(10) Patent No.: US 12,200,345 B2
(45) Date of Patent: Jan. 14, 2025

(54) IMAGE SELECTION METHOD AND ELECTRONIC DEVICE

(71) Applicant: HONOR DEVICE CO., LTD., Guangdong (CN)

(72) Inventors: Yanhua Chen, Guangdong (CN); Hongma Liu, Guangdong (CN); Yaqi Zhang, Guangdong (CN); Chao Zhang, Guangdong (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 207 days.

(21) Appl. No.: 17/764,391

(22) PCT Filed: Sep. 23, 2020

(86) PCT No.: PCT/CN2020/116963
§ 371 (c)(1),
(2) Date: Mar. 28, 2022

(87) PCT Pub. No.: WO2021/057752
PCT Pub. Date: Apr. 1, 2021

(65) Prior Publication Data
US 2022/0343648 A1  Oct. 27, 2022

(30) Foreign Application Priority Data

Sep. 29, 2019  (CN) .......................... 201910936462.7

(51) Int. Cl.
*H04N 23/617* (2023.01)
*G06N 3/084* (2023.01)
(Continued)

(52) U.S. Cl.
CPC .......... *H04N 23/617* (2023.01); *G06N 3/084* (2013.01); *G06V 10/75* (2022.01); *G06V 10/82* (2022.01);
(Continued)

(58) Field of Classification Search
None
See application file for complete search history.

(56) References Cited

U.S. PATENT DOCUMENTS 9,807,301 B1 *  10/2017  Weisberg ............... H04N 23/64
2008/0192129 A1 *  8/2008  Walker ................... H04N 23/66
348/231.2
(Continued)

FOREIGN PATENT DOCUMENTS

CN  104185981 A  12/2014
CN  105635567 A   6/2016
(Continued)

OTHER PUBLICATIONS

Liu Zhenpeng et al; "HRS-DC: Hybrid Recommendation Model Based on Deep Learning"; Computer Engineering and 1 Applications; Jun. 13, 2019; with English Translation, 19 pages.

*Primary Examiner* — Paul M Berardesca

(57) ABSTRACT

Disclosed are an image selection method and an electronic device. In the method, an electronic device can detect feedback information related to a user operation. The feedback information may include an optimal image selected by a decision model and a changed optimal image. The feedback information may further include images that are deleted, browsed, added-to-favorites, or shared and operation records. The feedback information may further include a facial feature in a gallery and a proportion of images including the facial feature in the gallery. The electronic device adjusts, according to the feedback information, parameters of the decision model configured to perform image selection, to obtain an updated decision model. The electronic device can perform image selection according to the updated decision model. Through the implementation of
(Continued)

the technical solution, a selected optimal image is more in line with user habits, thereby improving convenience.

15 Claims, 20 Drawing Sheets

(51) Int. Cl.
| | | |
|---|---|---|
| *G06V 10/75* | (2022.01) | |
| *G06V 10/82* | (2022.01) | |
| *G06V 10/94* | (2022.01) | |
| *G06V 20/00* | (2022.01) | |
| *G06V 20/30* | (2022.01) | |
| *G06V 40/16* | (2022.01) | |
| *H04N 1/00* | (2006.01) | |
| *H04N 1/21* | (2006.01) | |
| *H04N 23/63* | (2023.01) | |
| *H04N 101/00* | (2006.01) | |
| *G06F 3/04817* | (2022.01) | |
| *G06F 3/0482* | (2013.01) | |

(52) U.S. Cl.
CPC ............ *G06V 10/945* (2022.01); *G06V 20/30* (2022.01); *G06V 20/35* (2022.01); *G06V 40/168* (2022.01); *G06V 40/174* (2022.01); *H04N 1/00453* (2013.01); *H04N 1/00458* (2013.01); *H04N 1/00461* (2013.01); *H04N 1/215* (2013.01); *H04N 23/631* (2023.01); *G06F 3/04817* (2013.01); *G06F 3/0482* (2013.01); *H04N 2101/00* (2013.01); *H04N 2201/0084* (2013.01)

(56) References Cited

U.S. PATENT DOCUMENTS

| | | | | |
|---|---|---|---|---|
| 2009/0284621 | A1* | 11/2009 | Oks | H04N 23/64 |
| | | | | 348/231.6 |
| 2010/0194963 | A1* | 8/2010 | Terashima | H04N 23/743 |
| | | | | 348/E5.022 |
| 2013/0208127 | A1* | 8/2013 | Chou | H04N 23/632 |
| | | | | 348/169 |
| 2016/0073036 | A1* | 3/2016 | Chen | H04N 5/77 |
| | | | | 348/231.2 |
| 2016/0253564 | A1 | 9/2016 | Jeong et al. | |
| 2017/0374280 | A1* | 12/2017 | Chan | H04N 1/00183 |
| 2018/0137119 | A1 | 5/2018 | Li et al. | |
| 2019/0171910 | A1* | 6/2019 | Danielsson | G06F 18/214 |
| 2022/0269720 | A1* | 8/2022 | Luo | G06F 3/0482 |

FOREIGN PATENT DOCUMENTS

| | | | | |
|---|---|---|---|---|
| CN | 105893578 | A | | 8/2016 |
| CN | 106570028 | A | | 4/2017 |
| CN | 107025437 | A | | 8/2017 |
| CN | 107659722 | A | | 2/2018 |
| CN | 107871011 | A | | 4/2018 |
| CN | 108184063 | A | | 6/2018 |
| CN | 108876782 | A | | 11/2018 |
| CN | 109831618 | A | | 5/2019 |
| CN | 110012225 | A * | 7/2019 | .......... G06K 9/3233 |
| JP | 2004135029 | A | | 4/2004 |

\* cited by examiner

IMAGE SELECTION METHOD AND ELECTRONIC DEVICE

This application is a national stage of International Application No. PCT/CN2020/116963, filed on Sep. 23, 2020, which claims priority of Chinese Patent Application No. 201910936462.7, filed on Sep. 29, 2019. Both of them are hereby incorporated by reference in its entirety.

TECHNICAL FIELD

This application relates to the field of terminal technologies, and in particular, to an image selection method and an electronic device.

BACKGROUND

The continuous shooting function is a shooting function to continuously capture a plurality of images in a short period of time and store the captured images in the cache. In the related art, an increasing number of electronic devices (such as smartphones and tablet computers) support the continuous shooting function. The electronic device may select, according to parameters such as the sharpness of the captured images, composition, and expressions of person images, an optimal image from the plurality of images obtained through continuous shooting, and display the optimal image as an optimal image.

However, the optimal image displayed by the electronic device is often not a favorite image of a user among the plurality of images obtained through continuous shooting. The user needs to reselect an optimal image from the plurality of images, thereby reducing convenience.

SUMMARY

This application provides an image selection method and an electronic device. The electronic device may update a decision model according to feedback information related to a user operation and perform image selection according to an updated decision model, so that a selected optimal image is more in line with user habits, thereby improving convenience.

According to a first aspect, this application provides an image selection method, the method including: detecting, by an electronic device, first feedback information, the first feedback information including a plurality of images and a user operation acting on an image in the plurality of images; adjusting, by the electronic device, parameters of a decision model according to the first feedback information to obtain an updated decision model; and selecting, by the electronic device, a first image from a first image group as an optimal image of the first image group according to the updated decision model.

Through performing the method provided according to the first aspect, the electronic device may adjust, according to the user operation, the parameters of the decision model configured to select the optimal image from the plurality of images. In this way, the optimal image selected by the updated decision model is more in line with user habits, so that manual reselection from the plurality of images by the user is reduced, thereby improving convenience.

In the embodiments of this application, the first feedback information may include: (1) the optimal image selected by the decision model and a changed optimal image; (2) images that are deleted, browsed, added-to-favorites, or shared; and (3) a facial feature in the gallery and a proportion of images including the facial feature in the gallery.

(1) The Optimal Image Selected by the Decision Model and a Changed Optimal Image Specifically, before the detecting, by an electronic device, first feedback information, the method further includes: displaying, by the electronic device, a first user interface, the first user interface including a second image group, the second image group being images obtained through continuous shooting and including a second image and a third image, the second image being an optimal image of the second image group selected by the electronic device according to the decision model; the detecting, by an electronic device, first feedback information includes: detecting, by the electronic device, a first user operation on the first user interface, and changing, by the electronic device, the optimal image of the second image group to the third image in response to the first user operation; and the first feedback information includes the first user operation, the second image, and the third image.

For example, the electronic device may detect that the optimal image selected by the decision model includes a "smiling" image feature, and the changed optimal image includes a "laughing" image feature. The electronic device increases a weight of the "laughing" image feature in the decision model, and reduces a weight of the "smiling" image feature. When the adjusted decision model is used to perform image selection in continuous shooting in a portrait scene, the electronic device may select an image that includes the "laughing" image feature.

In another example, in a landscape shooting scene, the electronic device may detect that the optimal image selected by the decision model includes an image feature of a diagonal composition, and the changed optimal image includes an image feature of a central composition. The electronic device increases a weight of the image feature of the central composition in the decision model, and reduces a weight of the image feature of the diagonal composition. When the adjusted decision model is used to perform image selection in continuous shooting in a landscape shooting scene, the electronic device may select an image that includes the image feature of the central composition.

The first user interface may be a continuous shooting image interface, and the continuous shooting image interface may include the images obtained through continuous shooting. The first user operation may include a touch operation acting on a selected identifier on the second image, a touch sliding operation acting on an image display region, a touch operation acting on an unselected identifier on the third image, or a user operation acting on a determining control. In response to the first user operation, the electronic device changes the optimal image of the images obtained through continuous shooting to the third image. The optimal image before change may be referred to as the second image, and an optimal image after change may be referred to as the third image.

The images obtained through continuous shooting may be obtained in a manner in which the electronic device performs continuous shooting on a camera application interface in response to a long-press operation acting on a photographing control. The electronic device may display, in response to a touch operation acting on a thumbnail control, the images obtained through continuous shooting on the continuous shooting image interface.

After the electronic device changes the optimal image of the images obtained through continuous shooting to the third image, the electronic device may display a prompt interface to prompt a user to adjust the decision model according to feedback information. For example, the electronic device may display a prompt: "The change feedback has been received, and photos that are more in line with your preferences will be recommended based on the change."
(2) Images that are Deleted, Browsed, Added-to-Favorites, or Shared With reference to the first aspect, in some embodiments, the first feedback information includes an operation record of an image in the gallery and the image corresponding to the operation record, and the operation record indicates one or more of the following operations: a delete operation, a browse operation, an adding-to-favorites operation, and a sharing operation.

In the embodiments of this application, the images that are deleted, browsed, added-to-favorites, or shared may be images that are deleted, browsed, added-to-favorites, or shared in the gallery, or may be images that are deleted, browsed, added-to-favorites, or shared in another application such as an instant messaging application (WeChat).

The feedback information is not limited to the images that are deleted, browsed, added-to-favorites, or shared, but may further include images that are edited, printed, annotated, and reminded. An edited image includes, for example, an image with color, brightness, or another parameter adjusted. A printed image may be an image that the electronic device requests a printer to print. An annotated image may be, for example, an image that is annotated on a user interface. A reminded image is, for example, a reminded image set on a user interface.

The electronic device may periodically (for example, every 24 hours) record quantities of times of deleting, browsing, adding-to-favorites, or sharing images in the gallery. The electronic device may respectively set corresponding tag values for deletion, browsing, adding-to-favorites, or sharing. Next, the electronic device may recognize a shooting scene of an operated image, and adjust a weight of a corresponding image feature according to the operated image and a tag value corresponding to the image.
(3) A Facial Feature in the Gallery and a Proportion of Images Including the Facial Feature in the Gallery With reference to the first aspect, in some embodiments, the first feedback information includes the first facial feature and a proportion of the images including a first facial feature in the gallery, the first facial feature being a facial feature corresponding to the largest quantity of images in the gallery that include the facial feature, and the gallery including images stored in the electronic device.

Exemplarily, a facial feature a indicates a face image of Lisa, a facial image B indicates a face image of Rechel, and a facial image C indicates a face image of Kate.

With reference to the first aspect, in some embodiments, the adjusting, by the electronic device, parameters of a decision model according to the first feedback information to obtain an updated decision model includes: increasing, by the electronic device, a weight of a facial expression score of the first facial feature in the decision model, the facial expression score being used for scoring an expression of a facial feature in an image, images in the first image group each including one or more facial features, the one or more facial features including the first facial feature.

In the embodiments of this application, the electronic device may determine a facial expression score by using an image semantic feature and/or an image parameter. For example, a face detected by the electronic device includes a "smiling" image feature and an "eyes-open" image feature, and the sharpness, illumination uniformity, and richness of details all reach a specified threshold, the electronic device may obtain a facial expression score according to detected image semantic features and image parameters.

The optimal image may include a face image corresponding to the largest quantity of images in the gallery, and the face image has the highest expression score. In this way, the selected image is more in line with user habits, so that manual reselection from the plurality of images by the user is reduced, thereby improving convenience.

In the embodiments of this application, updating the decision model may be that: after a user operation of enabling a continuous shooting function is detected, the parameters of the decision model are adjusted according to the face images in the gallery when the end of the long-press operation acting on the photographing control is detected, and the optimal image in the images that are obtained through this continuous shooting is selected according to the adjusted decision model. The face images in the gallery and a quantity of images that correspond to each face image vary according to the accumulation of acquired images. Therefore, the parameters of the decision model are adjusted in real time after the continuous shooting function is executed, which can improve the accuracy of image selection in continuous shooting performed by the adjusted decision model.

In the embodiments of this application, the electronic device may alternatively update the decision model periodically.

With reference to the first aspect, in some embodiments, the adjusting, by the electronic device, parameters of a decision model according to the first feedback information to obtain an updated decision model includes: increasing, by the electronic device, a weight of a portrait body proportion score of the first facial feature in the decision model, the portrait body proportion score being used for scoring a body proportion of a facial feature in an image, images in the first image group each including one or more facial features, the one or more facial features including the first facial feature.

The electronic device may further determine a portrait body proportion score of a face image by using an image semantic feature and/or an image parameter. For example, the electronic device detects features of various parts of a complete portrait of a specific face image (such as an "arm" image feature and a "leg" image feature), and then calculates a body proportion score of the complete portrait according to the various parts of the complete figure.

The electronic device adjusts the weight of the facial feature in the decision model according to the quantity of corresponding images. Specifically, a greater quantity of corresponding images in the gallery indicates a greater weight of the facial feature, and a smaller quantity of corresponding images in the gallery indicates a smaller weight of the facial feature. A greater proportion of corresponding images in the gallery indicates a greater weight of the facial feature, and a smaller proportion of corresponding images in the gallery indicates a smaller weight of the facial feature.

In the embodiments of this application, the electronic device may train the decision model by using an original training sample set. A decision model obtained through training may be used as a teacher network. The electronic device may use some features of the teacher network in a process of training the adjusted decision model. Specifically, the electronic device may perform a softmax transformation on the teacher network to obtain a soft target. The soft target may represent some features of the original training sample set, and is used for training the decision model to obtain the adjusted decision model.

The updated decision model may be used in an image selection scenario in continuous shooting or a display scenario of thumbnails in the gallery.

1. The Updated Decision Model Used in an Image Selection Scenario in Continuous Shooting Specifically, before the selecting, by the electronic device, a first image from a first image group as an optimal image of the first image group according to the updated decision model, the method further includes: displaying, by the electronic device, a camera application interface, the camera application interface including a photographing control; and performing, by the electronic device in response to a second user operation acting on the photographing control, continuous shooting to obtain the first image group; and after the selecting, by the electronic device, a first image from a first image group as an optimal image of the first image group according to the updated decision model, the method further includes: displaying, by the electronic device, a continuous shooting image interface in response to a third user operation used for displaying the first image group, the continuous shooting image interface including the first image and thumbnails of the images in the first image group.

In the embodiments of this application, the first image (for example, an image including a "laughing" image feature) is selected from the first image group according to the first feedback information, which is more in line with user habits and preferences, thereby improving the accuracy of recommending images to a user.

An electronic image display region may further include a prompt to prompt an image selected according to the first feedback information, for example, prompt that "Recommend a face with a laughing expression according to the feedback".

2. The Updated Decision Model Used in a Display Scene of Thumbnails in the Gallery Specifically, before the selecting, by the electronic device, a first image from the first image group as an optimal image of the first image group according to the updated decision model, the method further includes: detecting, by the electronic device, the first image group from the gallery, thumbnails of the first image group being displayed adjacently in a gallery application interface, each of the images in the first image group including a first image feature, the first image feature including a second facial feature or a first shooting scene; and after the selecting, by the electronic device, a first image from a first image group as an optimal image of the first image group according to the updated decision model, the method further includes: displaying, by the electronic device, the gallery application interface in response to a fourth user operation acting on a gallery icon, the gallery application interface including the thumbnails of the images in the first image group, and a size of a thumbnail of the first image being greater than a size of a thumbnail of any other image in the first image group.

In the embodiments of this application, the images in the first image group may include the same image feature, for example, the same facial feature, that is, the second facial feature. The first image group is not limited to including the same facial feature, and may alternatively include the same shooting scene, for example, the first shooting scene. The first shooting scene is, for example, a landscape shooting scene.

Optionally, the electronic device may further display a recommendation identifier on the thumbnail of the first image, to indicate that an image corresponding to the thumbnail is an optimal image selected from a plurality of images (the first image group).

With reference to the first aspect, in some embodiments, before the selecting, by the electronic device, a first image from a first image group as an optimal image of the first image group according to the updated decision model, the method further includes: displaying, by the electronic device, a second user interface, the second user interface including a plurality of image feature options and a determining control, each of the plurality of image feature options being corresponding to an image feature; displaying, by the electronic device, a first option from an unselected state to a selected state in response to a fifth user operation acting on the first option, the plurality of image feature options including the first option; and adjusting, by the electronic device, the parameters of the decision model according to an image feature corresponding to the first option in response to a sixth user operation acting on the determining control, to obtain the updated decision model.

In the embodiments of this application, the second user interface may be a prompt box. Exemplarily, the prompt box includes a plurality of image feature options: one set of options is an unsmiling option, a smiling option, and a laughing option, another set of options is a front-face option and a side-face option, and still another set of options is an eyes-closed option and an eyes-open option. Each option may include a selected state and an unselected state. The electronic device may switch and display the status of an option as a selected state or an unselected state in response to a user operation acting on the option, for example, a touch operation. When the unsmiling option is in a selected state, a weight corresponding to an "unsmiling" image feature may be increased, and when the unsmiling option is in an unselected state, the weight corresponding to the "unsmiling" image feature may be reduced. The smiling option corresponds to a "smiling" image feature, and the laughing option corresponds to a "laughing" image feature. In response to a user operation acting on the determining control, for example, a touch operation, the electronic device may obtain an option in a selected state, for example, the laughing option, the front-face option, or the eyes-open option. The user operation acting on the determining control may be referred to as a sixth user operation.

In the embodiments of this application, the image features are selected by a user according to personal preferences, and are more in line with user habits, so that manual reselection from the plurality of images by the user is reduced, thereby improving convenience.

According to a second aspect, an embodiment of this application provides an electronic device, including: one or more processors, a memory, and a display screen, the memory being coupled to the one or more processors, the memory being configured to store computer program code, the computer program code including computer instructions, and the one or more processors invoking the computer instructions to cause the electronic device to perform the following steps: detecting first feedback information, the first feedback information including a plurality of images and a user operation acting on an image in the plurality of images; adjusting parameters of a decision model according to the first feedback information to obtain an updated decision model; and selecting a first image from the first image group as an optimal image of the first image group according to the updated decision model.

The electronic device provided according to the second aspect may implement: adjusting, according to the user operation, the parameters of the decision model configured to select the optimal image from the plurality of images. In this way, the optimal image selected by the updated decision model is more in line with user habits, so that manual reselection from the plurality of images by the user is reduced, thereby improving convenience.

With reference to the second aspect, in some embodiments, the one or more processors are further configured to invoke the computer instructions to cause the electronic device to perform the following step: displaying a first user interface, the first user interface including a second image group, the second image group being images obtained through continuous shooting and including a second image and a third image, the second image being an optimal image of the second image group selected by the electronic device according to the decision model; the one or more processors are specifically configured to invoke the computer instructions to cause the electronic device to perform the following step: detecting a first user operation on the first user interface, and changing the optimal image of the second image group to the third image in response to the first user operation; and the first feedback information includes the first user operation, the second image, and the third image.

With reference to the second aspect, in some embodiments, the first feedback information includes an operation record of an image in the gallery and the image corresponding to the operation record, and the operation record indicates one or more of the following operations: a delete operation, a browse operation, an adding-to-favorites operation, and a sharing operation.

With reference to the second aspect, in some embodiments, the first feedback information includes a first facial feature and a proportion of images including the first facial feature in the gallery, the first facial feature being a facial feature corresponding to the largest quantity of images in the gallery that include the facial feature, and the gallery including images stored in the electronic device.

With reference to the second aspect, in some embodiments, the one or more processors are specifically configured to invoke the computer instructions to cause the electronic device to perform the following step: increasing a weight of a facial expression score of the first facial feature in the decision model, the facial expression score being used for scoring an expression of a facial feature in an image, images in the first image group each including one or more facial features, the one or more facial features including the first facial feature.

With reference to the second aspect, in some embodiments, the one or more processors are specifically configured to invoke the computer instructions to cause the electronic device to perform the following step: increasing a weight of a portrait body proportion score of the first facial feature in the decision model, the portrait body proportion score being used for scoring a body proportion of a facial feature in an image, images in the first image group each including one or more facial features, the one or more facial features including the first facial feature.

With reference to the second aspect, in some embodiments, the one or more processors are further configured to invoke the computer instructions to cause the electronic device to perform the following steps: displaying a camera application interface, the camera application interface including a photographing control; and performing continuous shooting in response to a second user operation acting on the photographing control, to obtain the first image group; and displaying a continuous shooting image interface in response to a third user operation used for displaying the first image group, the continuous shooting image interface including the first image and thumbnails of the images in the first image group.

With reference to the second aspect, in some embodiments, the one or more processors are further configured to invoke the computer instructions to cause the electronic device to perform the following step: detecting the first image group from the gallery, thumbnails of the first image group being displayed adjacently in a gallery application interface, each of the images in the first image group including a first image feature, the first image feature including a second facial feature or a first shooting scene; and the one or more processors are further configured to invoke the computer instructions to cause the electronic device to perform the following step: displaying the gallery application interface in response to a fourth user operation acting on a gallery icon, the gallery application interface including the thumbnails of the images in the first image group, and a size of a thumbnail of the first image being greater than a size of a thumbnail of any other image in the first image group.

With reference to the second aspect, in some embodiments, the one or more processors are further configured to invoke the computer instructions to cause the electronic device to perform the following steps: displaying a second user interface, the second user interface including a plurality of image feature options and a determining control, each of the plurality of image feature options being corresponding to an image feature; displaying a first option from an unselected state to a selected state in response to a fifth user operation acting on the first option, the plurality of image feature options including the first option; and adjusting the parameters of the decision model according to an image feature corresponding to the first option in response to a sixth user operation acting on the determining control, to obtain the updated decision model.

According to a third aspect, an embodiment of this application provides a chip, the chip being applicable to an electronic device and including one or more processors, the processors being configured to invoke computer instructions to cause the electronic device to perform the method described according to the first aspect and any possible implementation in the first aspect.

According to a fourth aspect, an embodiment of this application provides a computer program product including instructions, the computer program product, when run on an electronic device, causing the electronic device to perform the method described according to the first aspect and any possible implementation in the first aspect.

According to a fifth aspect, an embodiment of this application provides a computer-readable storage medium including instructions, the instructions, when run on an electronic device, causing the electronic device to perform the method described according to the first aspect and any possible implementation in the first aspect.

Understandably, the electronic device provided according to the second aspect, the chip provided according to the third aspect, the computer program product provided according to the fourth aspect, and the computer storage medium provided according to the fifth aspect are all configured to perform the method provided in the embodiments of this application. Therefore, for beneficial effects that can be achieved, reference may be made to the beneficial effects in the corresponding method, and details are not described herein again.

BRIEF DESCRIPTION OF DRAWINGS

FIG. 1(A) and FIG. 1(B) to FIG. 12 are schematic diagrams of some application interfaces according to the embodiments of this application;

DESCRIPTION OF EMBODIMENTS

Figure 1A:
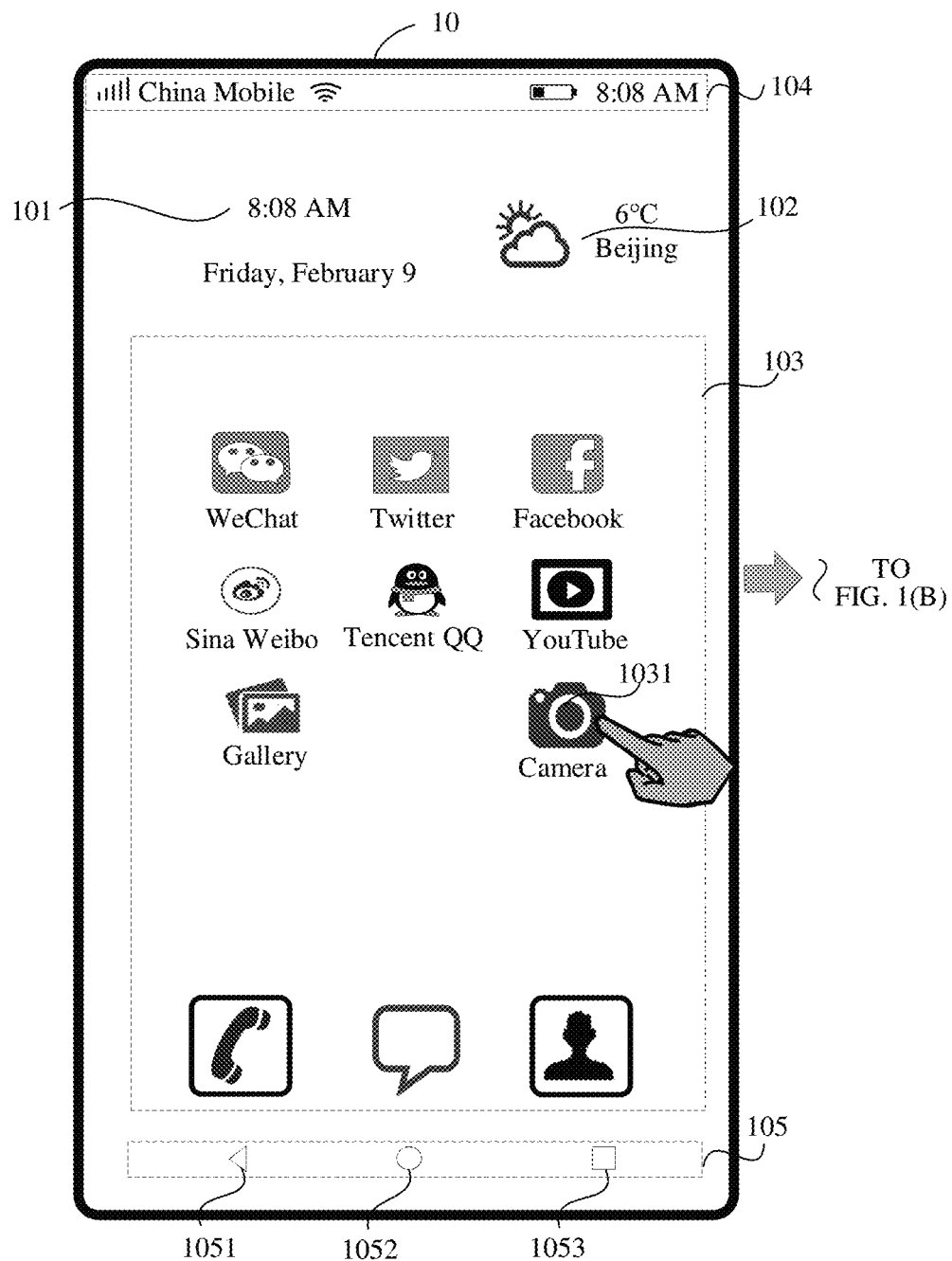

Terms used in the following embodiments of this application are only intended to describe particular embodiments, and are not intended to limit this application. As used in this specification and the claims of this application, a singular expression form, "one", "a", "said", "foregoing", "the", or "this", is intended to also include a plural expression form, unless clearly indicated to the contrary in the context. It should be further understood that the term "and/or" used in this application indicates and includes any or all possible combinations of one or more listed items.

Because the embodiments of this application relate to the application of neural networks, in order to facilitate understanding, the following first describes related terms, neural networks, and other related concepts involved in the embodiments of this application.

1. Image Selection in Continuous Shooting

After a plurality of images are continuously captured, the electronic device may construct a decision model by using a neural network, and select an image from the plurality of images as an optimal image by using the decision model. The decision model may be configured to select the optimal image according to shooting scenes, image semantic features, and image parameters (for example, sharpness and brightness).

The electronic device may recognize the shooting scenes and the image semantic features through image recognition. The shooting scenes include, for example, a portrait scene, an animal scene, a landscape scene, and a sports scene. The electronic device may further recognize semantic features of the captured images in different shooting scenes. For example, when it is recognized that a shooting scene is a portrait scene, the electronic device may further recognize an expression, a front face/side face, open/closed eyes, or the like. In another example, when it is recognized that the shooting scene is a sports scene, the electronic device may further recognize indoor sports/outdoor sports. Through image recognition, the image semantic features recognized by the electronic device may further include the composition of the captured image, for example, a diagonal composition, a central composition, or a "Tic Tac Toe" composition. It can be understood that the examples are merely used to explain the embodiments of this application and shall not constitute a limitation, and the recognized shooting scenes and the image semantic features are not limited to the above examples.

The electronic device may further recognize an image parameter of each of the plurality of captured images. The image parameter may include any one or more of the following: sharpness, illumination uniformity, contrast, saturation, brightness, whether it is overexposed or too dark, whether there is a color block, whether there is a color cast, and whether it is too cold. The algorithm used by the electronic device to recognize the image parameter is not limited in the embodiments of this application.

(2) Neural Network

A neural network may be composed of neurons. A neuron may refer to an arithmetic unit that uses $x_s$ and an intercept 1 as inputs. The output of the arithmetic unit may be:

$$h_{w,b}(x) = f(W^T x) = f(\Sigma_{s=1}^n W_s x_s + b) \quad (1\text{-}1)$$

where s=1, 2, . . . , or n, n is a natural number greater than 1, $W_s$ is a weight of $x_s$, and b is a bias of the neuron. $f$ is an activation function of the neuron, which is used for introducing a nonlinear characteristic into the neural network to transform an input signal in the neuron into an output signal. The output signal of the activation function may be used as an input of a next convolutional layer. The activation function may be a sigmoid function. The neural network is a network formed by connecting many of the above single neurons together. That is, an output of a neuron may be an input of another neuron. An input of each neuron may be connected with a local receptive field of a previous layer to extract a feature of the local receptive field. The local receptive field may be a region including several neurons.

(3) Deep Neural Network

A deep neural network (deep neural network, DNN), also known as a multi-layer neural network, can be understood as a neural network with a plurality of hidden layers. According to locations of different layers in the DNN, neural networks inside the DNN may be classified into three types: input layers, hidden layers, and output layers. Generally, the first layer is an input layer, the last layer is an output layer, and middle layers are all hidden layers. The layers are fully connected. That is, any neuron in the $i^{th}$ layer needs to be connected to any neuron in the $(i+1)^{th}$ layer. For each layer, a relationship between an input and an output is:

$$\vec{y} = \alpha(W\vec{x} + \vec{b}) \quad (1\text{-}2)$$

where $\vec{x}$ is an input vector, $\vec{y}$ is an output vector, $\vec{b}$ is an offset vector, W is a weight matrix (also referred to as a coefficient), and α is an activation function.

The following describes the coefficient W. In a three-layer DNN, a linear coefficient from the fourth neuron in the second layer to the second neuron in the third layer is defined as, where the superscript 3 represents a serial number of a layer at which the coefficient W is located, and subscripts correspond to the outputted third-layer index 2 and the inputted second-layer index 4. That is, a coefficient from the $k^{th}$ neuron in the $(L-1)^{th}$ layer to the $j^{th}$ neuron in the $L^{th}$ layer is defined as $W_{jk}^L$. The input layer has no W parameter.

In a deep neural network, more hidden layers make the deep neural network more capable of portraying complex situations in the real world. A model with more parameters has higher complexity and is more capable of completing more complex tasks.

The following describes functions of layers of a DNN in an image selection scenario in continuous shooting involved in the embodiments of this application.

a. Input Layer

An input vector of an input layer may represent an image, for example, a plurality of images obtained through continuous shooting in this application.

b. Hidden Layer

A process of calculation of a hidden layer may include a process of extracting an image feature of each of the plurality of images. For example, the image feature includes different expressions (unsmiling, smiling, laughing, and the like) in a portrait scene, whether eyes are closed, a front face/side face, or the like. In another example, the image feature further includes a depth of field of an image in a macro shooting scene of a bee or a butterfly. In another example, the image feature includes the composition of an image in a landscape shooting scene, including a diagonal composition, a central composition, and a "Tic Tac Toe" composition. Different features correspond to different weights. Exemplarily, a weight of an expression of laughing (that is, a "laughing" image feature) is less than a weight of an expression of smiling (that is, a "smiling" image feature). A weight of an expression when eyes are closed is less than a weight of an expression when eyes are open. A greater weight of the image feature indicates a greater probability that an image including the image feature is selected as an optimal image.

c. Output Layer

An output layer may output an image selection result, and the selection result indicates an optimal image selected from the plurality of images. For example, the output layer may calculate a probability of each image being selected, and an image with the highest selection probability is used as a selected optimal image. The selection probability of each image is determined according to an image feature in the hidden layer and a corresponding weight. For example, because a weight corresponding to an "unsmiling" image feature is less than a weight of a "smiling" image feature, a selection probability of an image including the "unsmiling" image feature is less than a selection probability of an image including the "smiling" image feature.

(4). Convolutional Neural Network

A convolutional neural network (convolutional neuron network, CNN) is a deep neural network with a convolutional structure. The convolutional neural network includes a feature extractor including a convolutional layer and a sampling sub-layer. The feature extractor may be considered as a filter, and a convolution process may be considered as using a trainable filter to convolve with an inputted image or convolutional feature map.

The convolutional layer refers to a neuron layer that convolves an input signal in the convolutional neural network. In a convolutional layer of the convolutional neural network, a neuron may be connected to only some neurons of an adjacent layer. A convolutional layer usually includes several feature maps. Each feature map may include some neurons arranged in a rectangular shape. Neurons of the same feature map share a weight. The weight shared herein is a convolution kernel. Sharing a weight may be understood as a manner of extracting image information and is unrelated to positions. The underlying principle is that statistical information of a specific part of an image is the same as statistical information of other parts. That means image information learned in one part may also be used in another part. Therefore, the same image information obtained through learning can be used for all positions on the image. In the same convolutional layer, a plurality of convolution kernels may be used to extract different image information. Generally, a larger quantity of convolution kernels indicates richer image information reflected by a convolution operation.

The convolution kernel may be initialized in the form of a matrix of a random size. During training of the convolutional neural network, the convolution kernel may obtain a proper weight through learning. In addition, a direct benefit of sharing a weight is to reduce connections between the layers of the convolutional neural network while reducing the risk of overfitting.

After the electronic device continuously captures the plurality of images, an algorithm model configured to select the optimal image that is used may also be a CNN.

(5) Loss Function

A process of training a deep neural network is a process of learning a weight matrix. An ultimate goal of training is to obtain a weight matrix of all layers of a trained deep neural network. The weight matrix of all the layers is a weight matrix formed by vectors W of the layers.

In the process of training the deep neural network, because an output of the deep neural network is expected to be as close as possible to a really desired predicted value, the electronic device may adjust a weight vector of each layer of the neural network by comparing a current network predicted value with a really desired target value and based on a difference between the two values. Certainly, there is usually an initialization process before the first adjustment, which is to pre-configure parameters for the layers in the deep neural network. Exemplarily, if the network predicted value is excessively high, the electronic device adjusts the weight vectors to make the predicted value lower, and keeps adjusting until the deep neural network can predict the really desired target value or a value that is quite close to the really desired target value.

Therefore, the electronic device needs to predefine "how to compare a difference between a predicted value and a target value", which is to predefine a loss function or an objective function. The loss function and the objective function are important equations used for measuring a difference between a predicted value and a target value. Using the loss function as an example, a higher output value (loss) of the loss function indicates a greater difference. The training process for the deep neural network is a process of minimizing the loss as much as possible.

(6) Back Propagation Algorithm

The deep neural network may modify an initial weight matrix during the training by using a loss function back propagation (back propagation, BP) algorithm, so that the difference between the predicted value and the target value becomes smaller. Specifically, an input signal is transmitted forward until an output generates an error loss, and the initial weight matrix is adjusted through back propagation of error loss information, so that the error loss is converged. The back propagation algorithm is a back propagation motion dominated by an error loss, and is intended to obtain, for example, an optimal weight matrix.

In the image display method provided by the embodiments of this application, the electronic device may detect user feedback. The user feedback may include the optimal image selected by the decision model during the image selection in continuous shooting and a changed optimal image. The user feedback may further include images that are deleted, browsed, added-to-favorites, or shared. The user feedback may further include a face image in a gallery obtained through the statistics of the electronic device. The electronic device may adjust parameters of the decision model for image selection in continuous shooting according to such user feedback to obtain an adjusted decision model. The electronic device may perform image selection in continuous shooting based on the adjusted decision model, and display an optimal image.

First feedback information mentioned in the embodiments of this application may include the foregoing user feedback, and an updated decision model is the adjusted decision model.

In the image display method, the electronic device may adjust, according to the user operation, the parameters of the decision model configured to select the optimal image from the plurality of images according to the user operation. In this way, the optimal image selected by the decision model is more in line with user habits, so that manual reselection from the plurality of images by the user is reduced, thereby improving convenience.

The following describes user interfaces provided in this embodiment of this application.

Figure 1B:
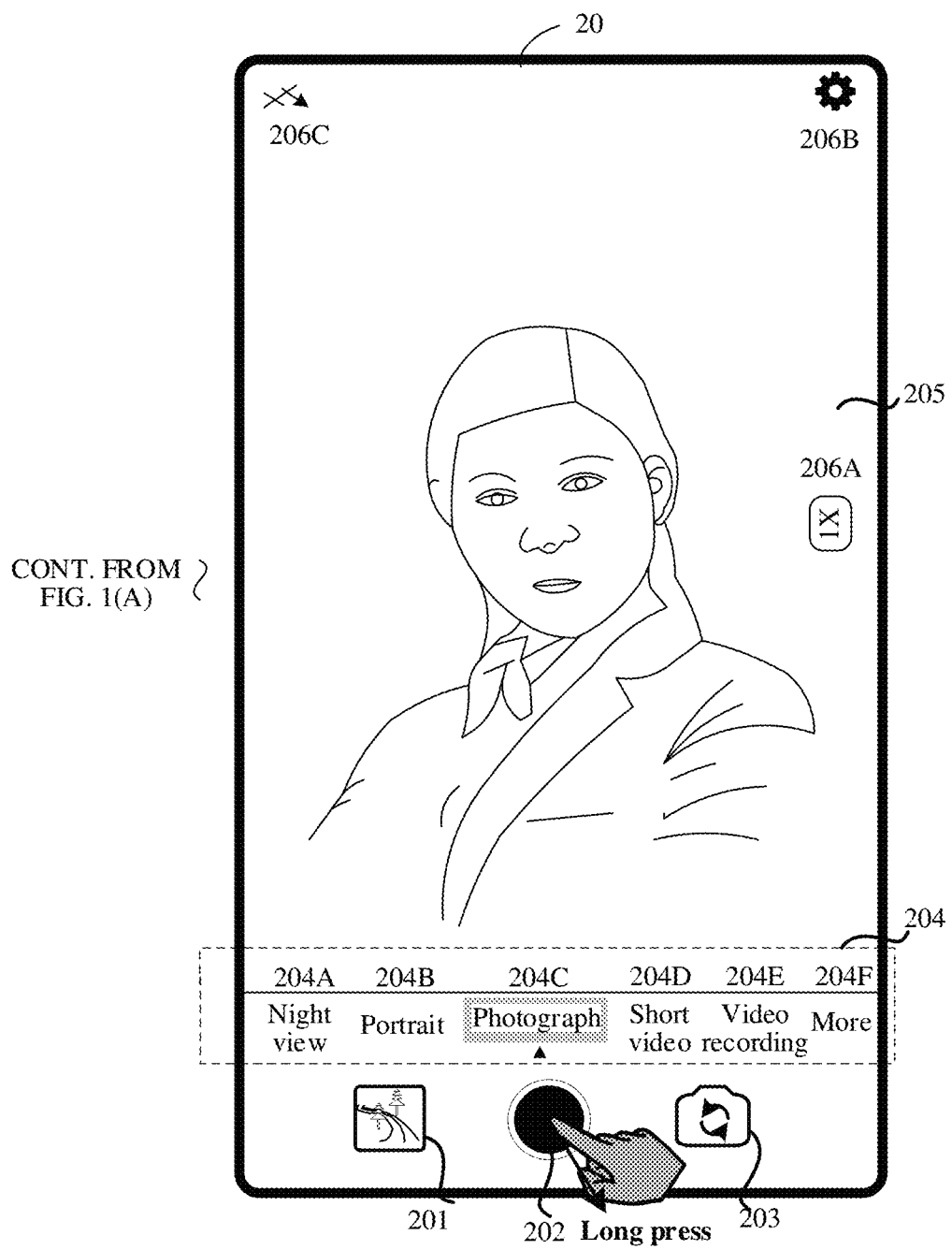

A user interface involved in enabling the continuous shooting function is first described. FIG. 1(A) and FIG. 1(B) are schematic diagrams of user interfaces according to an embodiment of this application. As shown in FIG. 1(A), the electronic device displays a home screen interface 10. As shown in FIG. 1(A), the home screen interface 10 includes a calendar widget 101, a weather widget 102, an application icon 103, a status bar 104, and a navigation bar 105. The calendar widget 101 may be configured for indicating a current time, for example, date, day of the week, hour and minute information, or the like.

The weather widget 102 may be configured to indicate the type of weather, for example, cloudy to sunny or light rain, indicate information such as temperature, or indicate a location.

The application icon 103 may include, for example, a WeChat icon, a Twitter icon, a Facebook icon, a Sina Weibo icon, a Tencent QQ icon, a YouTube icon, a gallery icon, or a camera icon 1031, and may further include another application icon. This is not limited in this embodiment of this application. An icon of any application may be configured for responding to a user operation, for example, a touch operation, so that the electronic device enables an application corresponding to the icon.

The status bar 104 may include a name of an operator (for example, China Mobile), time, a WI-FI icon, signal strength, and current remaining power.

The navigation bar 105 may include system navigation buttons such as a return button 1051, a home screen (home screen) button 1052, and a call out task history button 1053. The home screen interface 10 is an interface displayed after the electronic device 100 detects, on any user interface, a user operation acting on the home screen button 1052. When it is detected that a user taps the return button 1051, the electronic device 100 may display a previous user interface of a current user interface. When it is detected that the user taps the home screen button 1052, the electronic device 100 may display the home screen interface 10. When it is detected that the user taps the call out task history button 1053, the electronic device 100 may display a task recently opened by a first user. The navigation buttons may alternatively be named in another manner. For example, 1051 may be named Back Button, 1052 may be named Home Button, and 1053 may be named Menu Button. This is not limited in this application. The navigation buttons in the navigation bar 105 are not limited to virtual buttons, and may alternatively be implemented as physical buttons.

As shown in FIG. 1(A) and FIG. 1(B), in response to a user operation, for example, a touch operation, acting on the icon 1031 of camera, the electronic device may display a camera application interface 20. The camera application interface 20 may further include a thumbnail control 201, a photographing control 202, a camera switching control 203, a viewfinder frame 205, a focusing control 206A, a setting control 206B, and a flash switch 206C. The thumbnail control 201 is provided for the user to view captured pictures and videos.

The photographing control 202 is configured to enable the electronic device to capture a picture or video in response to a user operation.

The camera switching control 203 is configured to switch, between a front-facing camera and a rear-facing camera, a camera that acquires an image.

The viewfinder frame 205 is configured to perform a real-time preview and display of an acquired picture.

The focusing control 206A is configured to adjust the focus of the camera.

The setting control 206B is configured to set various parameters during image acquisition.

The flash switch 206C is configured to turn on/off a flash.

The user may long press the photographing control 202. In response to a second user operation, that is, a long-press operation acting on the photographing control 202, the electronic device may enable the continuous shooting function to acquire and store a plurality of images in a short time. When the long-press operation acting on the photographing control 202 ends, the electronic device may stop storing images, that is, this continuous image shooting process ends.

In this embodiment of this application, it is not limited to triggering the continuous shooting function by long pressing the photographing control 202. The electronic device may further trigger the continuous shooting function through another control design. This is not limited in the embodiments of this application.

Figure 2:
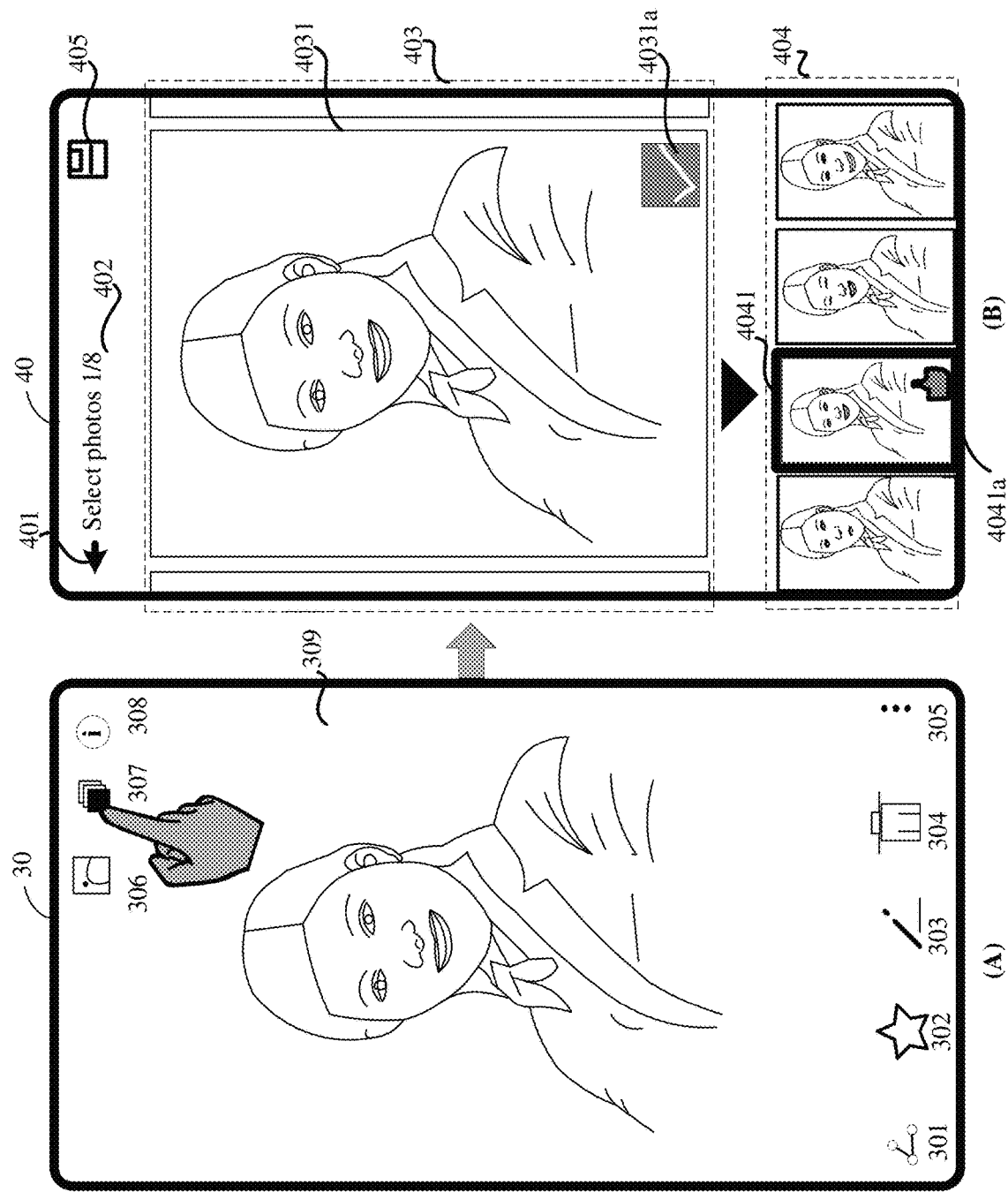

When a plurality of images are acquired by using the continuous shooting function, the electronic device may display the plurality of images in response to a touch operation acting on the thumbnail control 201. FIG. 2 is a schematic diagram of a user interface according to an embodiment of this application. As shown in (A) in FIG. 2, a user interface 30 may include a share control 301, a favorites control 302, an edit control 303, a delete control 304, a more control 305, a gallery control 306, a selection control 307, a photographing parameter control 308, and an image preview frame 309. The image preview frame 309 is configured to display an optimal image selected by the electronic device according to the decision model from the plurality of images obtained through continuous shooting.

Figure 3:
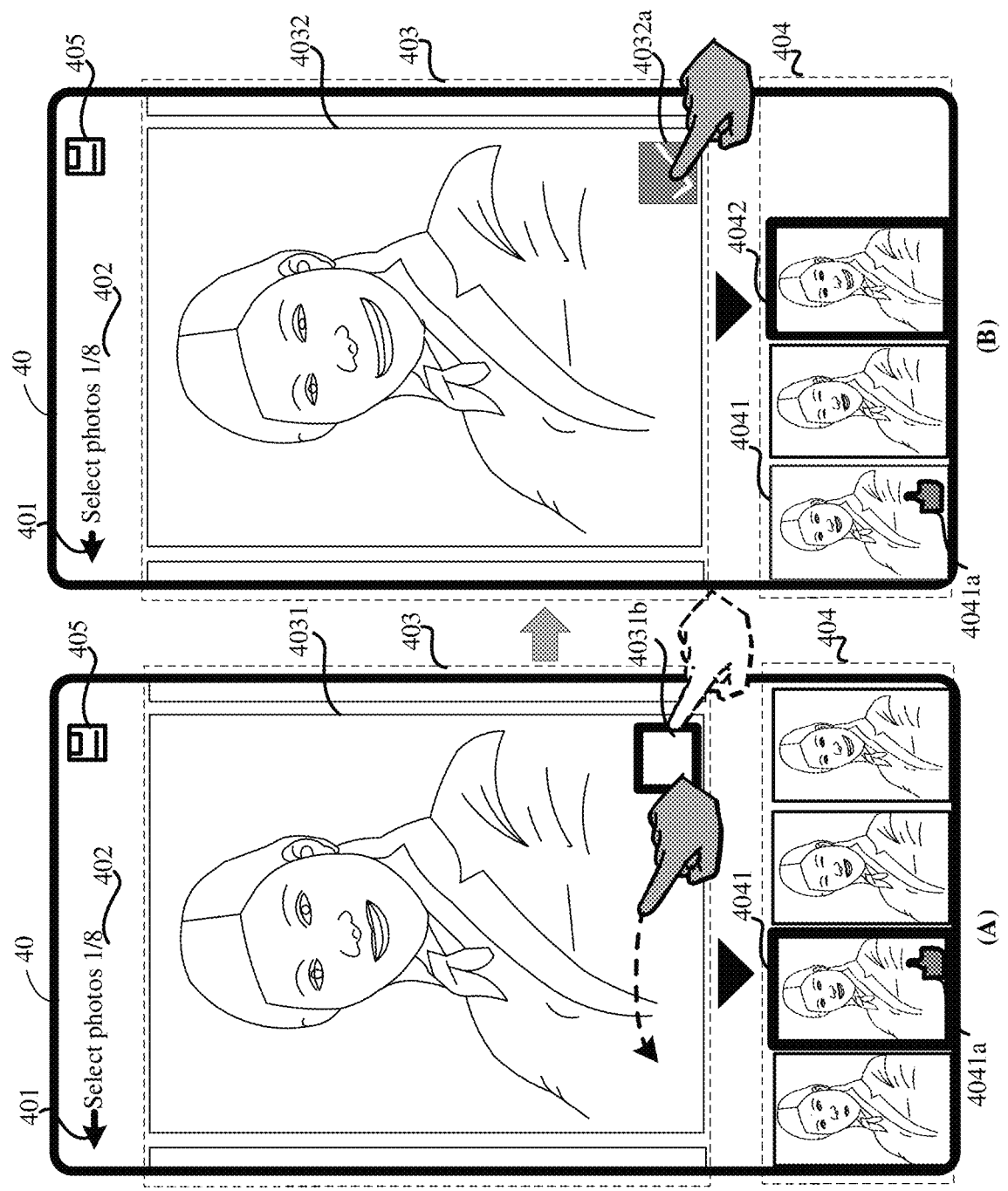

The optimal image is an optimal image 4031 shown in (A) in FIG. 3. For details, reference may be made to the example described in FIG. 3.

The share control 301 is configured to share an image displayed in the image preview frame 309 to another application, for example, share to WeChat, Tencent QQ, or the like.

The favorites control 302 is configured to add the image displayed in the image preview frame 309 to an added-to-favorites group. The user may view the image displayed in the image preview frame 309 in the added-to-favorites group.

The edit control 303 is configured to edit the image displayed in the image preview frame 309, for example, crop, adjust brightness, or add a filter.

The delete control is configured to delete the plurality of images obtained through continuous shooting.

The more control 305 is configured to perform another function operation on the image displayed in the image preview frame 309, for example, a printing function operation, or a function operation of setting a desktop background.

The gallery control 306 is configured to open a gallery application, and the gallery application includes captured images.

The photographing parameter control 308 is configured to enable the electronic device to display shooting parameters such as a shooting focal length, a storage path, and the amount of occupied memory of the optimal image in response to a user operation.

The selection control 307 is configured to change the optimal image obtained through continuous shooting. Specifically, as shown in (B) of FIG. 2, in response to a user operation acting on the selection control 307, the electronic device may display a user interface 40. The user may change the optimal image on the user interface 40. The user interface 40 includes a return control 401, a prompt 402, an image display region 403, a thumbnail display region 404, and a save control 405.

The return control 401 is configured to return to an upper-level interface of the user interface 40. In response to a user operation acting on the return control 401, the electronic device may display the user interface 30.

The prompt 402 may be configured to prompt a total quantity of images captured in this continuous image shooting process and a quantity of selected optimal images. Exemplarily, the prompt 402 may prompt "⅛", which indicates that a total quantity of images captured in this continuous image shooting process is 8 and a quantity of selected optimal images is 1. The eight images may be referred to as a second image group. The optimal image 4031 may be displayed in the image display region 403 by default, and as shown in (B) of FIG. 2, the optimal image 4031 includes a selected identifier 4031*a* by default, which indicates that the optimal image 4031 is selected. The user can touch and slide left or right in the image display region 403 to view another image in the images obtained through continuous shooting. In response to a touch sliding operation acting on the image display region 403, the electronic device may display more images in the image display region 403.

In this embodiment of this application, the electronic device may select, according to the decision model, the optimal image 4031 from the images obtained through continuous shooting.

As shown in (A) in FIG. 2, the optimal image 4031 is displayed in the image preview frame 309 by default.

The thumbnail display region 404 may include thumbnails of the images obtained through continuous shooting. Exemplarily, in this embodiment of this application, the thumbnail display region 404 may include thumbnails of the eight images that are obtained through continuous shooting. A thumbnail 4041 of the optimal image 4031 may include a recommendation identifier 4041*a*. As shown in (B) in FIG. 2, the thumbnail display region 404 may display thumbnails of four images. The user can touch and slide left or right in the thumbnail display region 404 to view another thumbnail. In response to a touch sliding operation acting on the thumbnail display region 404, the electronic device may display more thumbnails in the thumbnail display region 404.

In this embodiment of this application, the first user interface may be the user interface 40.

The user may change the optimal image obtained through continuous shooting. The optimal image 4031 includes the selected identifier 4031*a* and is an optimal image selected by the electronic device according to the decision model. Specifically, FIG. 3 is a schematic diagram of a user interface according to an embodiment of this application. As shown in (A) in FIG. 3, in response to a touch operation acting on the selected identifier 4031*a*, the electronic device may display an unselected identifier 4031*b* on the image 4031, which indicates that the image 4031 is not selected. As shown in (B) in FIG. 3, in response to a touch sliding operation acting on the image display region 403, the electronic device may display an image 4032 in the image display region 403. The image 4032 includes an unselected identifier. In response to a touch operation acting on the unselected identifier, the electronic device may display a selected identifier 4032*a* on the image 4032, which indicates that the image 4032 is selected. The image 4031 is an optimal image selected by the electronic device, and the image 4032 is a changed optimal image.

Figure 4:
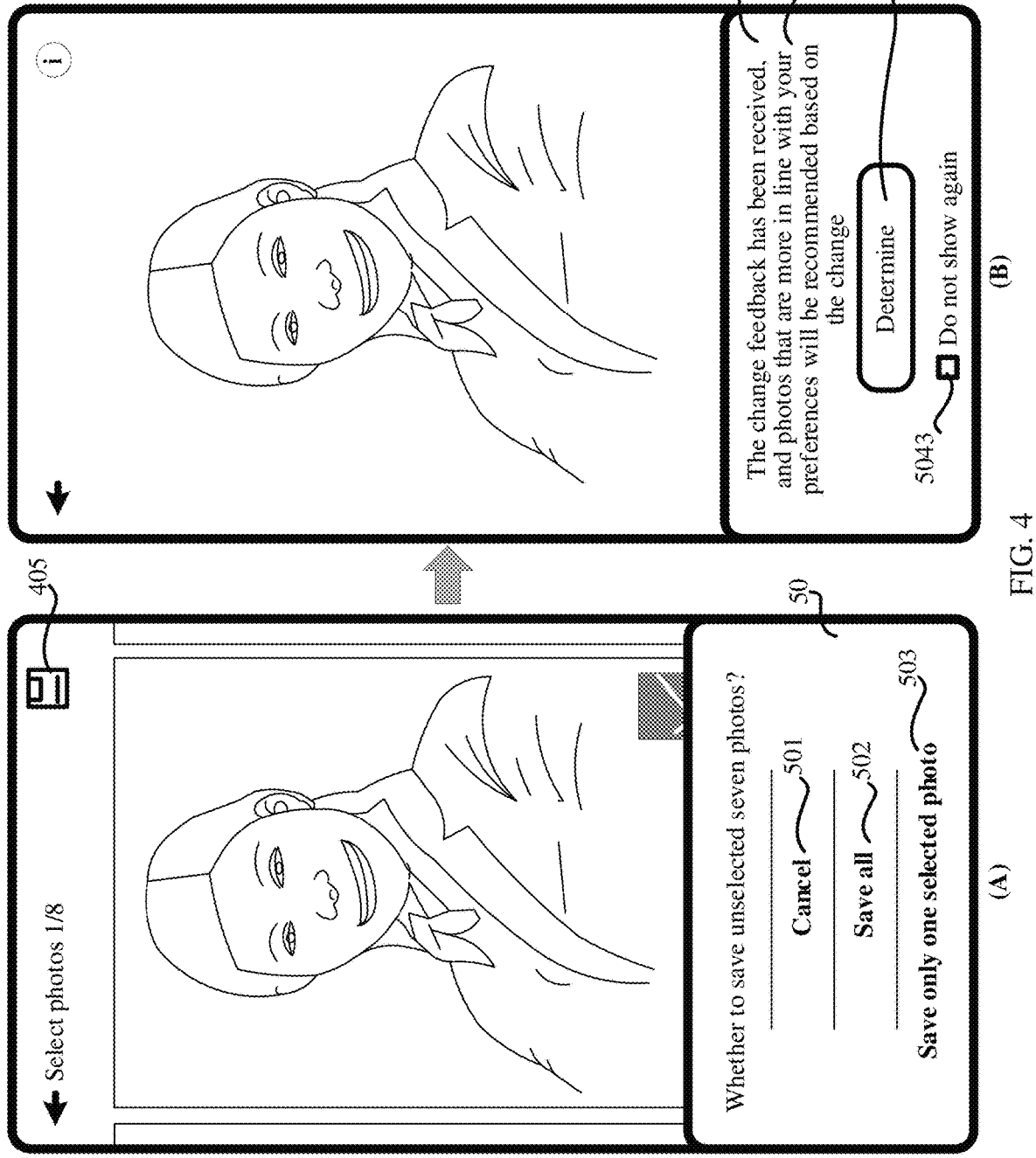

The user may touch the save control 405 so that the electronic device saves the optimal image changed by the user. Specifically, FIG. 4 is a schematic diagram of a user interface according to an embodiment of this application. As shown in (A) of FIG. 4, in response to a user operation (for example, a touch operation) acting on the save control 405, the electronic device may display a user interface 50. The user interface 50 may include a control 501, a control 502, and a control 503. The control 501 may prompt "Cancel". In response to a user operation acting on the control 501, the electronic device may display the user interface 40 shown in (B) of FIG. 3.

The control 502 may prompt "Save all". In response to a user operation acting on the control 502, the electronic device may store the selected optimal image 4032 and still save other unselected images, for example, still save the seven images other than the image 4032.

The control 503 may prompt "Save only one selected picture". In response to a user operation acting on the control 503, the electronic device may store the selected optimal image 4032 and delete other unselected images, for example, delete the seven images other than the image 4032. After the optimal image 4032 is stored, the user may view the optimal image 4032 in a user interface of the gallery application.

In this embodiment of this application, the electronic device may receive a user operation of changing the optimal image obtained through continuous shooting, for example, a user operation of changing the optimal image from the image 4031 to the image 4032 in FIG. 3. The electronic device may respond to a user operation acting on the control 502 or the control 503 and display a prompt box 504. As shown in (B) of FIG. 4, the prompt box 504 may include a prompt 5041, a control 5042, and an option 5043.

The prompt 5041 may be: "The change feedback has been received, and photos that are more in line with your preferences will be recommended based on the change."

In response to a user operation acting on the control 5042, the electronic device may no longer display the prompt box 504, display the user interface of the gallery, and preview the optimal image 4032

The option 5043 may prompt: "Do not show again". The option 5043 is in an unselected state, and in response to a user operation acting on the option 5043, the option 5043 is in a selected state. If the option 5043 is in a selected state, when the user changes the optimal image obtained through continuous shooting, the prompt box 504 no longer appears.

After the process of changing the optimal image obtained through continuous shooting described in FIG. 3 and FIG. 4, the optimal image 4031 selected by the decision model and the changed optimal image 4032 that are shown in FIG. 3 can be used as user feedback to adjust the parameters of the decision model for image selection in continuous shooting to obtain the adjusted decision model. In this embodiment of this application, the first user operation may include the touch operation acting on the selected identifier 4031*a* shown in (A) of FIG. 3, the touch sliding operation acting on the image display region 403, the touch operation acting on the unselected identifier on the image 4032, and the user operation acting on the control 502 or the control 503. In response to the first user operation, the electronic device changes the optimal image of the images obtained through continuous shooting to the image 4032. The optimal image 4031 before change may be referred to as the second image, and the optimal image 4032 after change may be referred to as the third image.

Exemplarily, as shown in FIG. 3 and FIG. 4, the electronic device detects that the optimal image 4031 is changed to the optimal image 4032. The optimal image 4031 includes a "smiling" image feature, and the optimal image 4032 includes a "laughing" image feature. The electronic device may adjust the parameters of the decision model, reduce a weight of the "smiling" image feature in the decision model, and increase a weight of the "laughing" image feature, to obtain the adjusted decision model.

In this embodiment of this application, it is not limited to detecting the first user interface on the user interface 40 to enable the electronic device to change the optimal image. One or more of a group of images (the second image group) obtained through continuous shooting may also be deleted, browsed, added-to-favorites or shared on the user interface 40. For a specific interface design and description, reference may be made to the related descriptions of FIG. 5 to FIG. 7(A), FIG. 7(B), and FIG. 7(C), and details are not be described herein again.

The user may delete, browse, add-to-favorites, or share images in the user interface of the gallery application. Image that are deleted, browsed, added-to-favorites, or shared may further be used as user feedback to adjust the parameters of the decision model for image selection in continuous shooting, to obtain the adjusted decision model. The following describes user interfaces related to deleting, browsing, adding-to-favorites, or sharing images.

Figure 5:
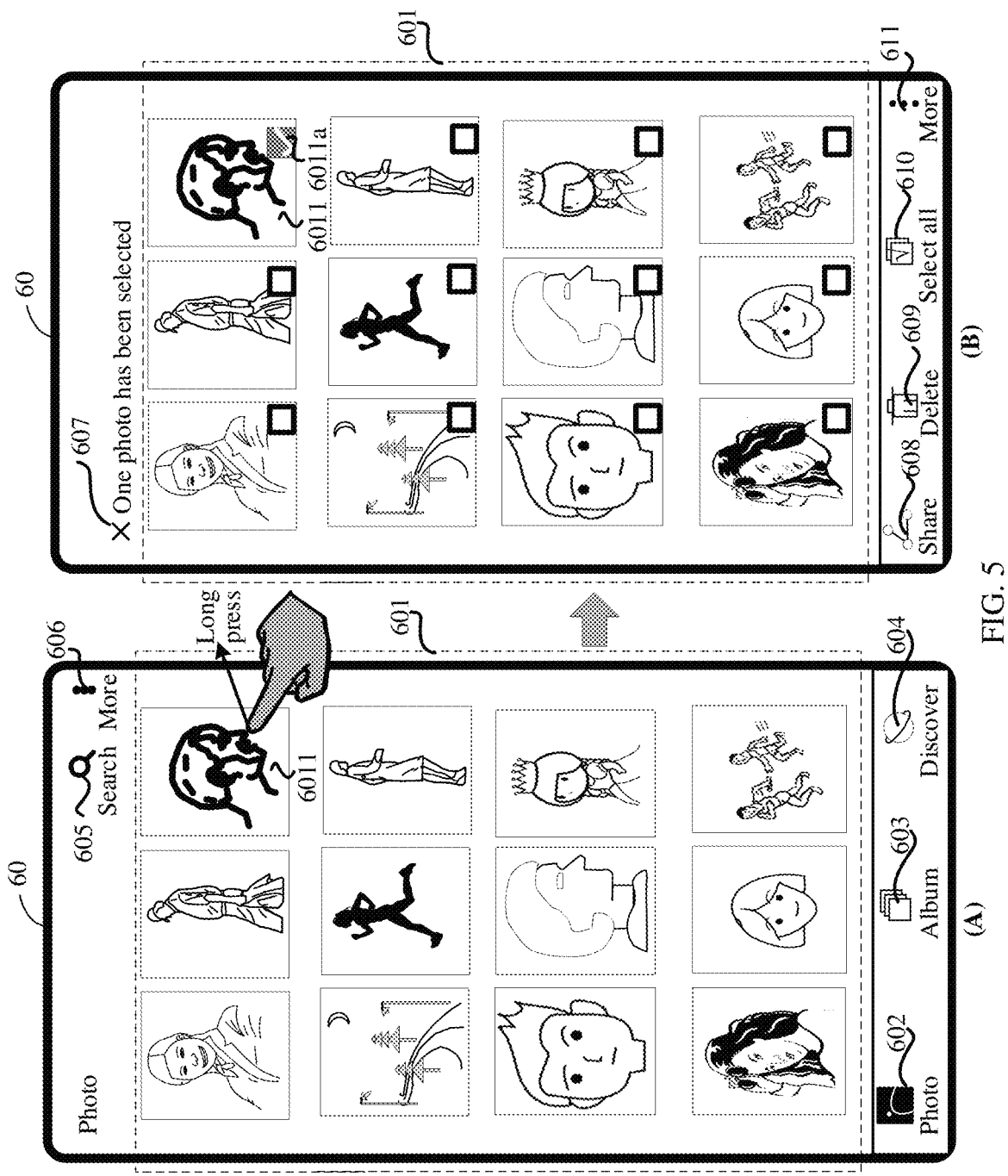

FIG. 5 is a schematic diagram of a user interface according to an embodiment of this application. (A) in FIG. 5 is a schematic diagram of a user interface 60 of the gallery. The user interface 60 may be displayed by the electronic device in response to a touch operation acting on a gallery icon. The gallery application may be configured to display images stored in the electronic device, and the user interface 60 may include thumbnails of the images. The display of the user interface 60 is not limited to this manner, and may be in another manner. For example, in the user interface 30 shown in (A) of FIG. 2, in response to a user operation acting on the selection control 307, the electronic device may display the user interface 60. The user interface 60 may include a thumbnail display region 601, a photo option 602, an album option 603, a discovery option 604, a search control 605, and a more option 606. The thumbnail display region 601 may include thumbnails of a plurality of images that are stored in the electronic device.

The photo option 602, the album option 603, and the discovery option 604 correspond to different thumbnail display regions. A currently selected option shown in (A) of FIG. 5 is the photo option 602. That is, thumbnails displayed in the thumbnail display region 601 are thumbnails under the photo option 602.

The search control 605 is configured to search for images.

The more option 606 may be configured to enable more functions, such as a hide album and settings.

The user may delete, browse, add-to-favorites, or share an image in the user interface 60. Exemplarily, as shown in (B) of FIG. 5, in response to a long-press operation acting on a thumbnail 6011, the electronic device may display edit controls in the user interface 60. The edit controls include a share control 608, a delete control 609, and a more control 611. The thumbnail 6011 may be any thumbnail, and the thumbnail 6011 further includes a selected identifier 6011*a*, which indicates that an image corresponding to the thumbnail 6011 is selected. As shown in (B) of FIG. 5, the user interface 60 may further include a select-all control 610 and an exit control 607. The exit control 607 is configured to exit an edit state. In response to a user operation acting on the exit control 607, the electronic device may display the user interface 60 shown in (A) of FIG. 5.

The share control 608 is configured to share a selected image to another application, for example, share to WeChat or Sina Weibo.

The delete control 609 is configured to delete the selected image.

The select-all control 610 is configured to select all images corresponding to thumbnails. As shown in (B) of FIG. 5, the thumbnail 6011 includes the selected identifier 6011*a*, and other thumbnails include unselected identifiers. In response to a user operation acting on the select-all control 610, the electronic device displays selected identifiers on all thumbnails, that is, all stored images are selected.

The more control 611 performs more operations on the selected image, such as performs printing, viewing detailed information, and adding-to-favorites.

In this embodiment of this application, it is not limited to deleting, adding-to-favorites, or sharing an image in the user interface 60 of the gallery, but may also be in another interface, for example, a user interface in which an image is displayed on the electronic device. Reference may be made to the example shown in (A) of FIG. 2.

In the user interface 60 shown in (A) of FIG. 5, in response to a touch operation acting on a thumbnail, the electronic device may display an image corresponding to the thumbnail. A corresponding user interface is analogous to the example shown in (A) of FIG. 2. The touch operation acting on the thumbnail may be considered as a user operation used for browsing an image. The electronic device may count a quantity of times or frequency of each image being browsed, and use the browsed image as user feedback to adjust the parameters of the decision model. A user interface of the image corresponding to the thumbnail is similar to (A) of FIG. 2, and may further include a share control, a delete control, and a favorites control. In response to a user operation acting on the favorites control, the electronic device adds the image corresponding to the thumbnail to an added-to-favorites group. The user may view the image in the added-to-favorites group. The added-to-favorites image may be used as user feedback to adjust the parameters of the decision model.

In this embodiment of this application, an added-to-favorites record of an image in the gallery may indicate a user operation acting on the favorites control. For the favorites control, reference may be made to the favorites control 302 described in FIG. 2. The image corresponding to the added-to-favorites record is an added-to-favorites image.

Figure 6:
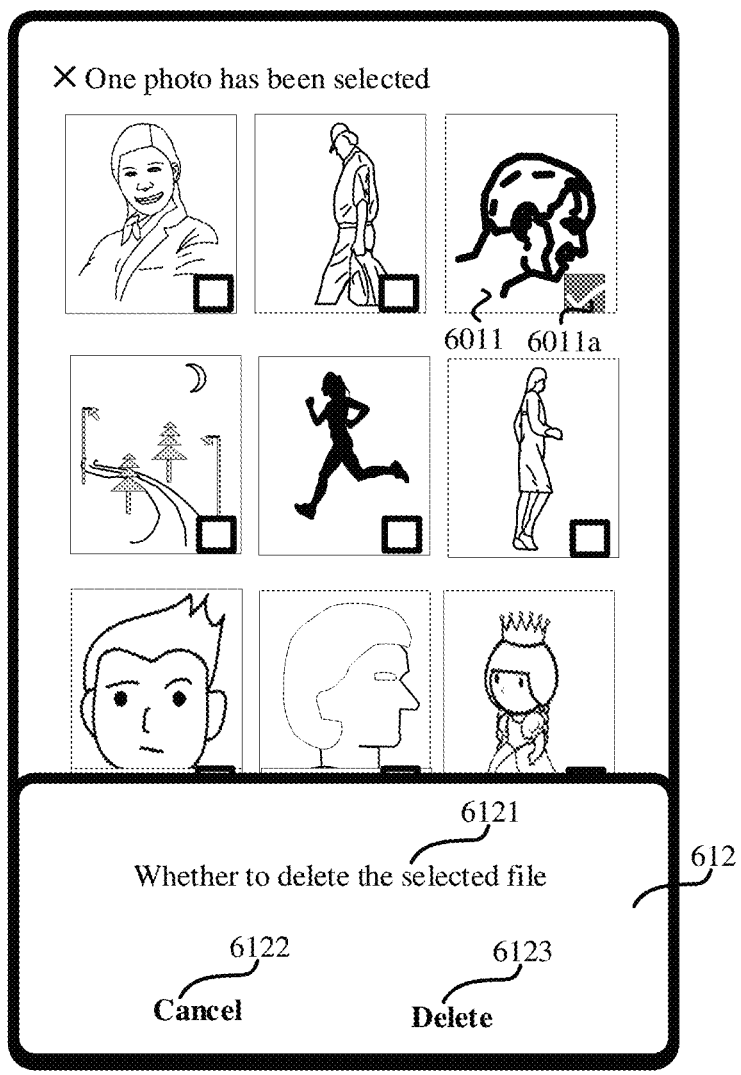

Some examples of deleting an image are described below. As shown in (B) of FIG. 5, in response to a user operation acting on the delete control 609, the electronic device may display a prompt box 612. FIG. 6 is a schematic diagram of a user interface according to an embodiment of this application. As shown in FIG. 6, in response to a user operation acting on a delete control 6123, the electronic device deletes a selected image, that is, the image corresponding to the thumbnail 6011. The image corresponding to the thumbnail 6011 is a deleted image and may be used as user feedback to adjust the parameters of the decision model.

It is not limited to deleting an image on the user interface shown in (B) of FIG. 5. As shown in (A) of FIG. 2, in response to a user operation acting on the delete control 304, the electronic device may also display the prompt box 612. After the electronic device deletes the images obtained through continuous shooting, the optimal image 4031 may be used as a deleted image, and the deleted image 4031 may be used as user feedback to adjust the parameters of the decision model. In another possible implementation, all images obtained through continuous shooting (for example, the eight images obtained through continuous shooting) are deleted images and can be used as user feedback to adjust the parameters of the decision model.

In this embodiment of this application, the deleted image includes, for example, the image corresponding to the thumbnail 6011. A delete record of an image in the gallery may include, for example, the long-press operation acting on the thumbnail 6011 and the user operation acting on the delete control 6123, and an image corresponding to the delete record is the image corresponding to the thumbnail 6011. The deleted image is not limited to the image corresponding to the thumbnail 6011, but further includes, for example, the following image: an image deleted by the electronic device in response to a user operation detected by the delete control 304 shown in (A) of FIG. 2.

Figure 7A:
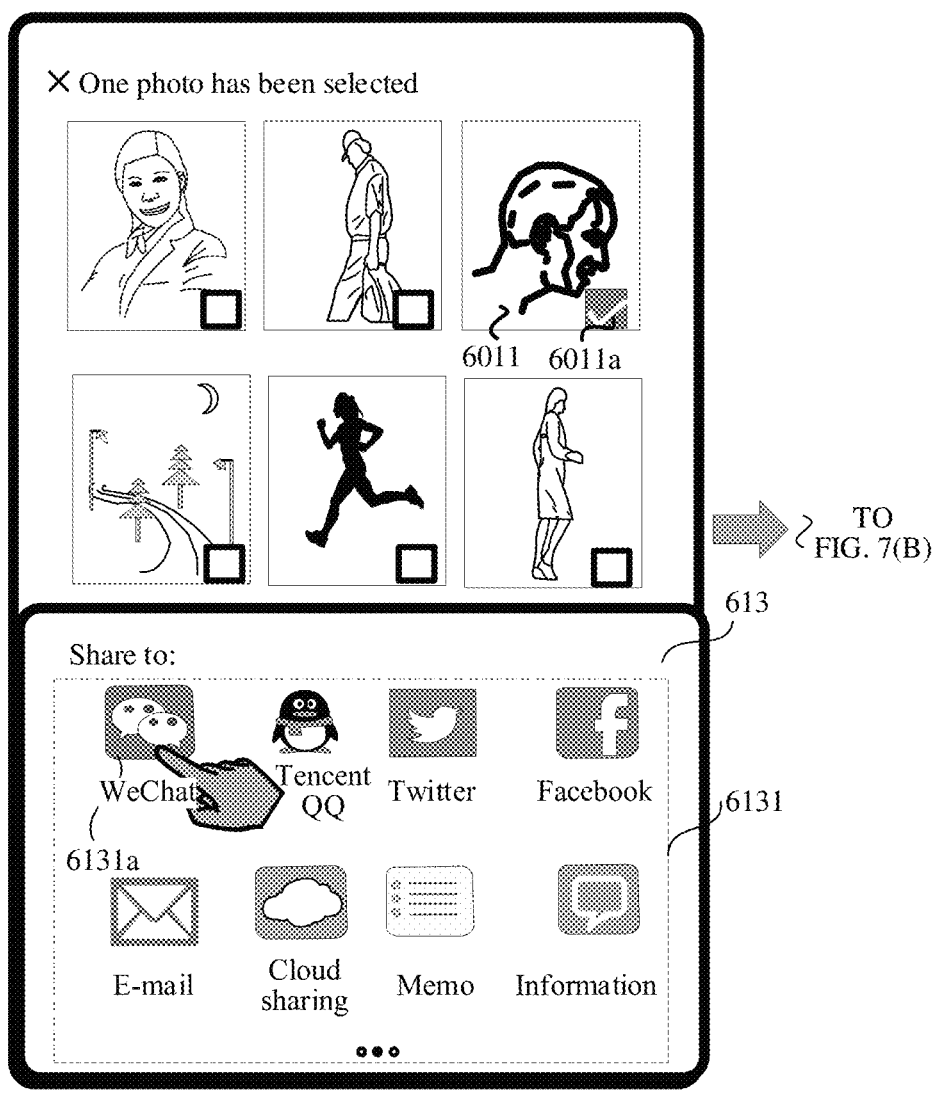
Figure 7B:
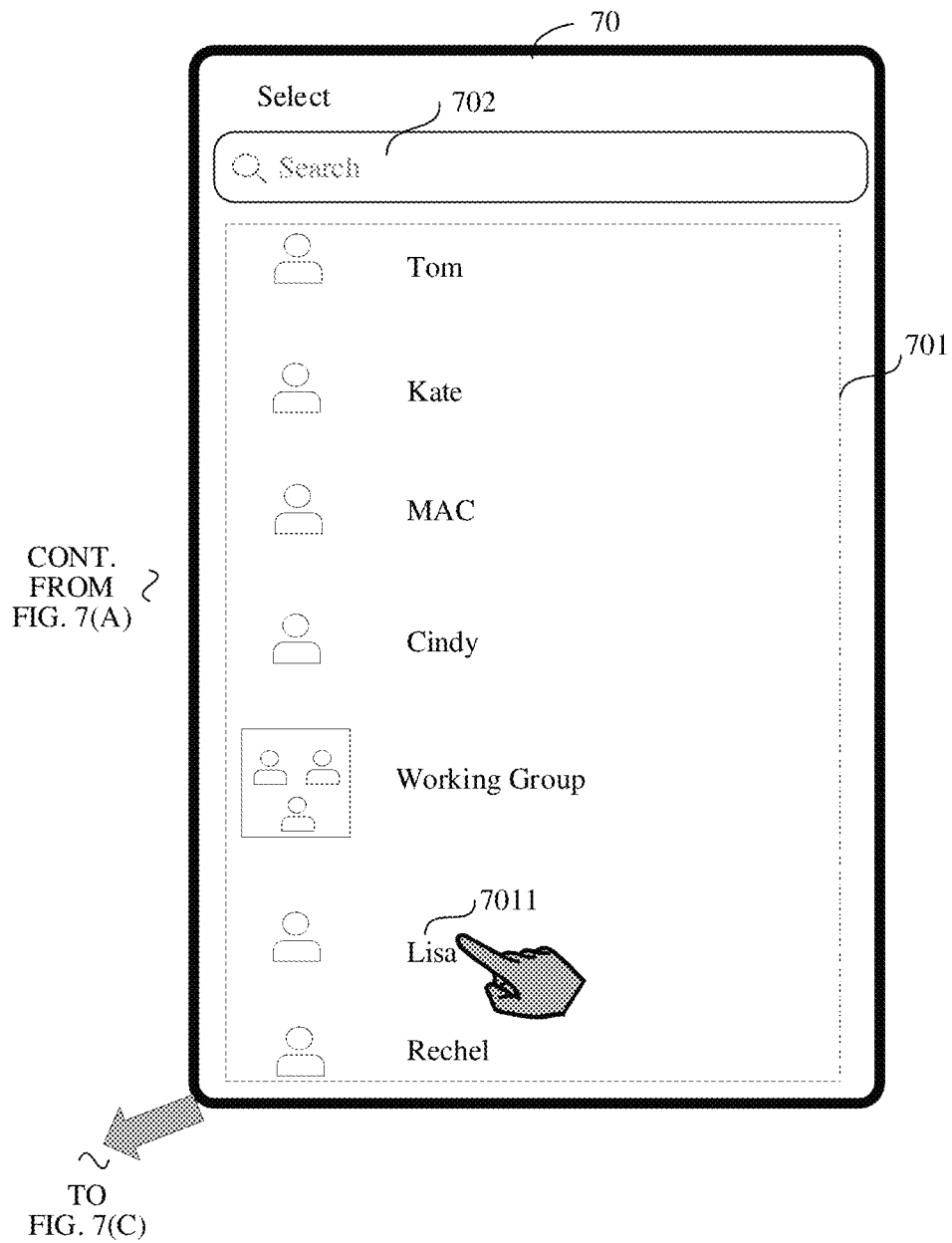
Figure 7C:
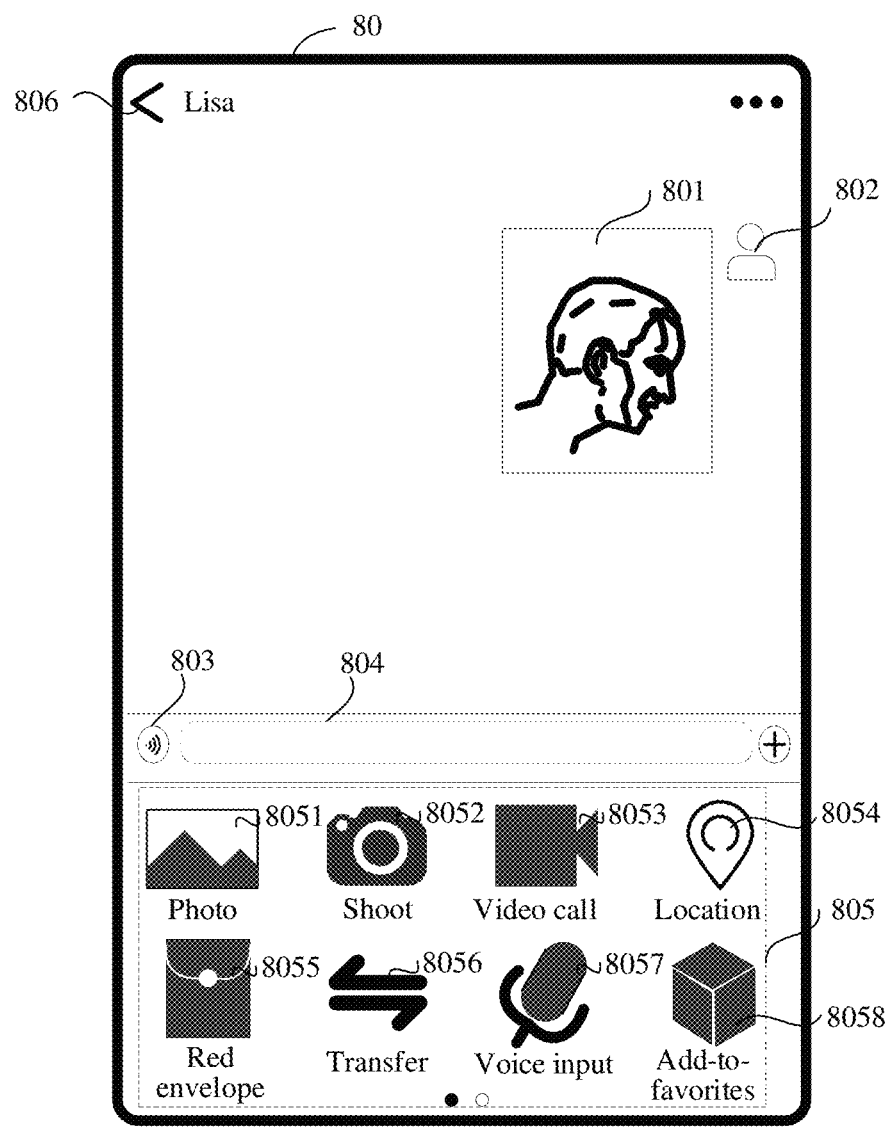

An example of sharing an image is described below. FIG. 7(A), FIG. 7(B), and FIG. 7(C) are schematic diagrams of user interfaces according to an embodiment of this application. As shown in FIG. 7(A), in response to a user operation acting on the share control 608 shown in (B) of FIG. 5, the electronic device may display a prompt box 613. The prompt box 613 may include an icon display region 6131. The icon display region 6131 may include a plurality of application icons, for example, a WeChat icon, a Tencent QQ icon, a Twitter icon, a Facebook icon, an E-mail icon, a cloud sharing icon, a memo icon, and an information icon. The user may touch and slide the icon display region 6131. In response to the touch sliding operation, the electronic device may display more application icons.

As shown in FIG. 7(B), in response to a user operation acting on a WeChat icon 6131a, the electronic device may display a user interface 70. The user interface 70 is an interface of WeChat. The user interface 70 includes a contact list 701 and a search box 702. The contact list 701 may include a plurality of contact identifiers. The search box 702 may be configured for searching for a contact.

As shown in FIG. 7(C), in response to a user operation acting on a contact icon 7011, the electronic device may display a user interface 80, and share a selected image shown in FIG. 7(A) to a contact dialog box shown in the user interface 80. Sharing the selected image to the contact dialog box means that the electronic device sends the selected image to a terminal corresponding to the contact. The user interface 80 may include a thumbnail 801, a user identifier 802, a voice control 803, an input box 804, a function control region 805, and a return control 806.

The thumbnail 801 corresponds to the thumbnail 6011 including the selected identifier 6011a shown in FIG. 7(A), which indicates that a corresponding image is shared with a user in WeChat.

The user identifier 802 indicates a user currently logging in to WeChat.

The voice control 803 is configured to send voice information. In response to a user operation acting on the voice control 803, the electronic device may detect voice information, and sends the voice information to a corresponding user, for example, sends the voice information to a user Lisa corresponding to a contact icon 7011.

The input box 804 is configured to send text information. The electronic device may receive text information by using the input box 804 and send the text information to a corresponding user.

The function control region 805 may include a photo option 8051, a shooting option 8052, a video call option 8053, a location option 8054, a red envelope option 8055, a transfer option 8056, a voice input option 8057, and an favorites option 8058.

The photo option 8051 is configured for sending an image to a user (for example, the user Lisa corresponding to the contact icon 7011).

The shooting option 8052 is configured for capturing an image and send the captured image to a user.

The video call option 8053 is configured for sending a voice call request or a video call request to a user.

The location option 8054 is configured for sending location information to a user.

The red envelope option 8055 and the transfer option 8056 are configured for sending a red envelope or transfer money to a user.

The voice input option 8057 is configured for sending voice information. The favorites option 8058 is configured for sending added-to-favorites content.

The return control 806 is configured to return to an upper-level interface of the user interface 80. A person skilled in the art shall understand that a logical upper-level interface of an interface is fixed and is determined when an application is designed.

In this embodiment of this application, when a user operation acting on the contact icon 7011 is detected, the electronic device may determine that the image corresponding to the thumbnail 6011 shown in FIG. 7(A) is a shared image. The image corresponding to the thumbnail 6011 may be used as user feedback to adjust the parameters of the decision model.

The shared image is not limited to the example shown in FIG. 7(A), FIG. 7(B), and FIG. 7(C), and the user can also share an image by using the picture option 8051 and the shooting option 8052 shown in FIG. 7(C). An image shared by using the picture option 8051 and the shooting option 8052 may also be used as user feedback to adjust the parameters of the decision model.

In this embodiment of this application, a share record of an image in the gallery may indicate a user operation acting on the share control 608 shown in (B) of FIG. 5. An image corresponding to the share record may indicate the image corresponding to the thumbnail 6011.

In this embodiment of this application, images that are deleted, browsed, added-to-favorites, or shared are not limited to the examples described in FIG. 5 to FIG. 7(A), FIG. 7(B), and FIG. 7(C). Images that are deleted, browsed, added-to-favorites, or shared and involved in other scenarios in this embodiment of this application are described below. As shown in FIG. 7(C), in response to a user operation acting on the thumbnail 801, for example, a touch operation, the electronic device may display the image corresponding to the thumbnail 801. The image corresponding to the thumbnail 801 is a browsed image and may be used as user feedback to adjust the parameters of the decision model. In this embodiment of this application, a browse record of an image in the gallery is, for example, a browse record of the image corresponding to the thumbnail 801. An image corresponding to the browse record is, for example, the image corresponding to the thumbnail 801.

Figure 8:
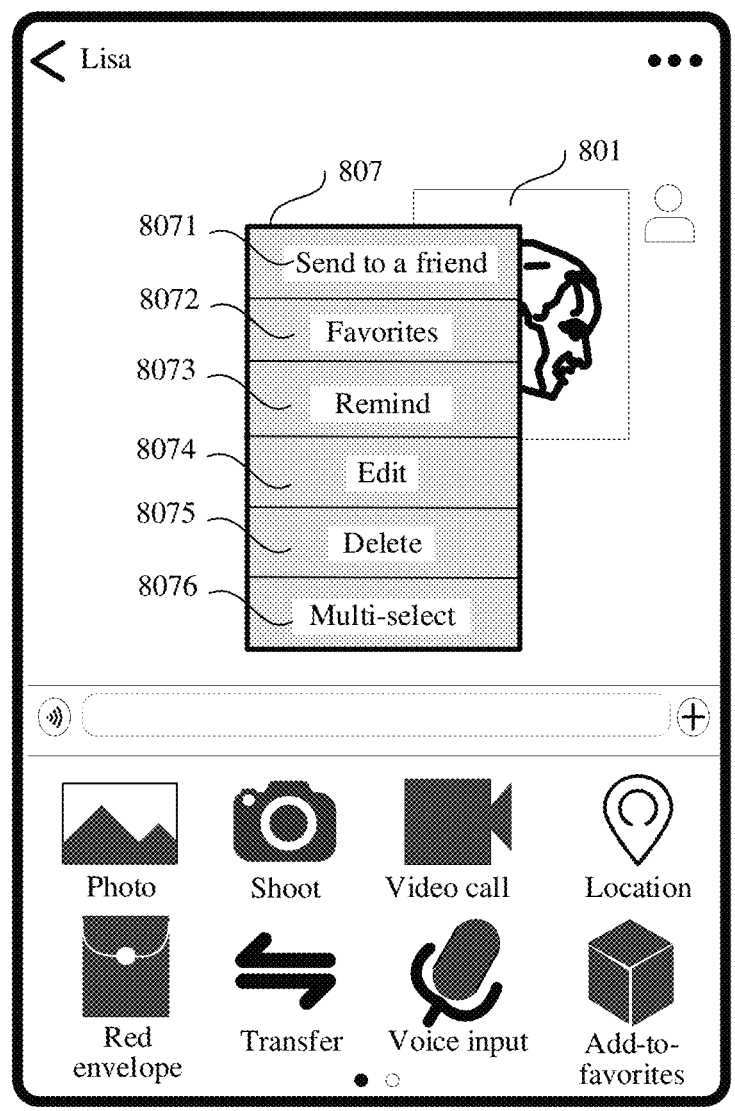

FIG. 8 is a schematic diagram of a user interface according to an embodiment of this application. As shown in FIG. 8, in response to a long-press operation acting on the thumbnail 801, the electronic device may display an option box 807. The option box 807 includes a send option 8071, an favorites option 8072, a reminder option 8073, an edit option 8074, a delete option 8075, and a multi-select option 8076.

The send option 8071 is configured for sending the image corresponding to the thumbnail 801 to other users.

The favorites option 8072 is configured for adding the image corresponding to the thumbnail 801 to favorites in WeChat.

The reminder option 8073 is configured for giving a reminder of the image corresponding to the thumbnail 801.

The edit option 8074 is configured for editing the image corresponding to the thumbnail 801.

The delete option 8075 is configured for deleting the thumbnail 801 in the user interface 80.

The multi-select option 8076 is configured for selecting a plurality of pieces of information.

In this embodiment of this application, in response to a user operation acting on the send option 8071, for example, a touch operation, the electronic device may record the image corresponding to the thumbnail 801 as a shared image, to use the shared image as user feedback to adjust the parameters of the decision model. In response to a user operation acting on the favorites option 8072, for example, a touch operation, the electronic device may record the image corresponding to the thumbnail 801 as an added-to-favorites image, to use the added-to-favorites image as user feedback to adjust the parameters of the decision model. In response to a user operation acting on the delete option 8075, for example, a touch operation, the electronic device may record the image corresponding to the thumbnail 801 as a deleted image, to use the deleted image as user feedback to adjust the parameters of the decision model.

The user feedback is not limited to the images that are deleted, browsed, added-to-favorites, or shared, but may further include images that are edited, printed, annotated, and reminded. An edited image includes, for example, an image with color, brightness, or another parameter adjusted. A printed image may be an image printed by using the more control 611 in the user interface 60. An annotated image may also be, for example, an image annotated by using the more control 611 in the user interface 60. A reminded image may be, for example, an image reminded by using the reminder option 8073 in the option box 807.

Figure 9:
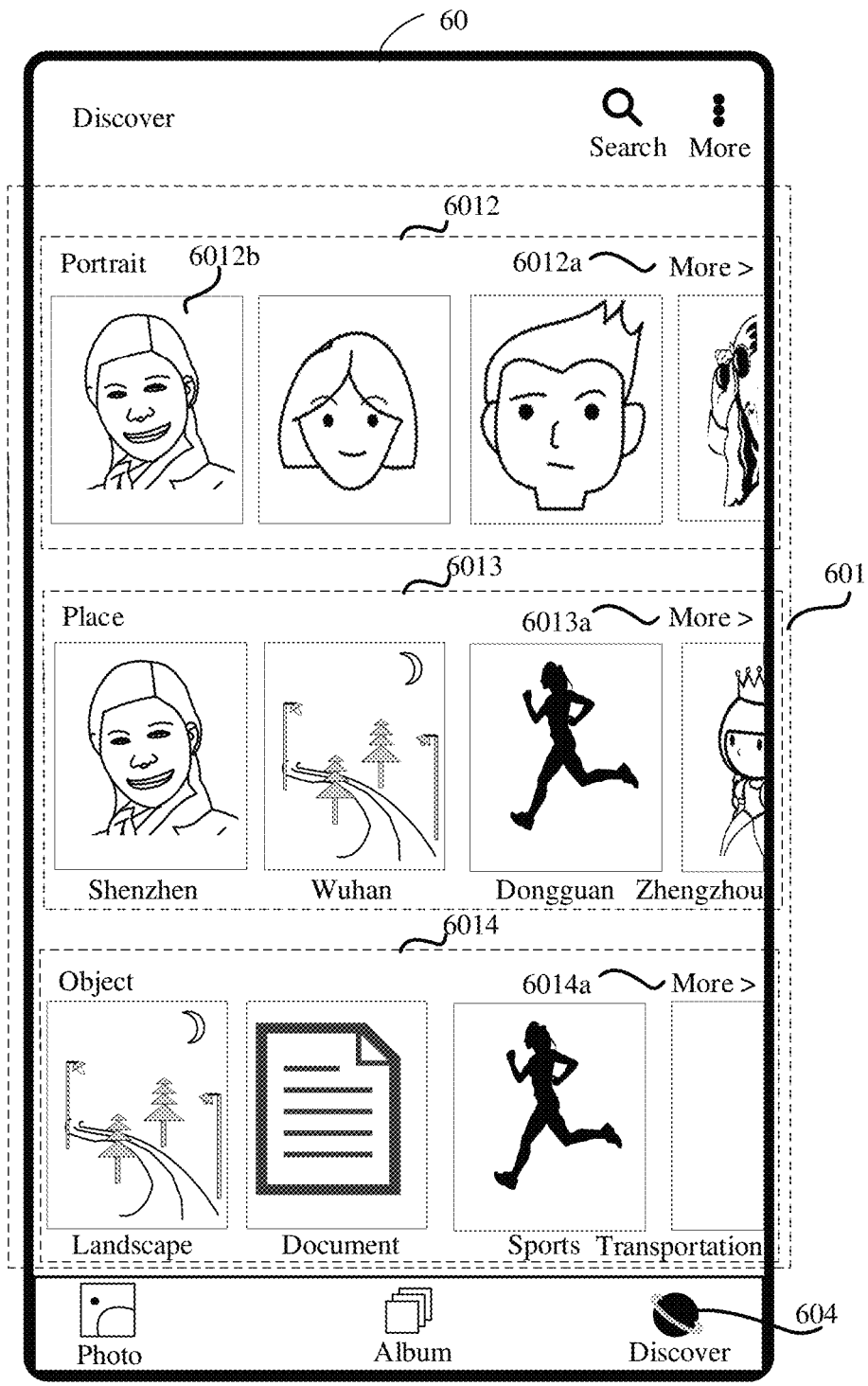

In this embodiment of this application, the electronic device may further obtain a face image in the gallery through statistics, and use the face image obtained through statistics to adjust the parameters of the decision model for image selection in continuous shooting. FIG. 9 is a schematic diagram of a user interface according to an embodiment of this application. In the user interface 60 shown in (A) of FIG. 5, in response to a user operation acting on the discovery option 604, as shown in FIG. 9, the electronic device may display thumbnails under the discovery option 604 in the thumbnail display region 601. The thumbnails under the discovery option 604 may include categories identified by the electronic device: a portrait category 6012, a location category 6013, and an object category 6014.

The portrait category 6012 includes thumbnails of recognized face images. The portrait category 6012 further includes a more control 6012*a*. In response to a user operation acting on the more control 6012*a*, the electronic device may display more thumbnails of recognized face images.

The portrait category 6012 is used for classifying images in the gallery according to facial features. Each of the thumbnails included in the portrait category 6012 corresponds to a facial feature. For any thumbnail, in response to a user operation acting on the thumbnail, the electronic device may display thumbnails of a plurality of images in the gallery that match the facial feature. For example, in response to a user operation acting on a thumbnail 6012*b*, the electronic device may display thumbnails of images that match a facial feature corresponding to the thumbnail 6012*b*.

The matching of a facial feature and an image means that a similarity between the facial feature and a facial feature included in the image is greater than a specified threshold, for example, 80%.

The location category 6013 is used for classifying the images in the gallery according to geographic locations at which the images are captured. The geographic locations include, for example, Shenzhen, Wuhan, and Dongguan. The location category 6013 further includes a more control 6013*a*. In response to a user operation acting on the more control 6013*a*, the electronic device may display more thumbnails of images obtained through classification according to the geographic locations. Each thumbnail corresponds to a geographic location. In response to a user operation acting on the thumbnail, the electronic device may display thumbnails of images in the gallery that have the same geographic location as the thumbnail.

The object category 6014 is used for classifying the images in the gallery according to object types. The object types include, for example, scenery, documents, sports, and vehicles. The object category 6014 further includes a more control 6014*a*. In response to a user operation acting on the more control 6014*a*, the electronic device may display more thumbnails of images obtained through classification according to the object types. Each thumbnail corresponds to an object type. In response to a user operation acting on the thumbnail, the electronic device may display thumbnails of images in the gallery that have the same object type as the thumbnail.

In this embodiment of this application, the face images included in the facial category 6012 may be used for adjusting the parameters of the decision model for image selection in continuous shooting. The face images in the portrait category may be further updated according to the update of captured images.

Figure 10:
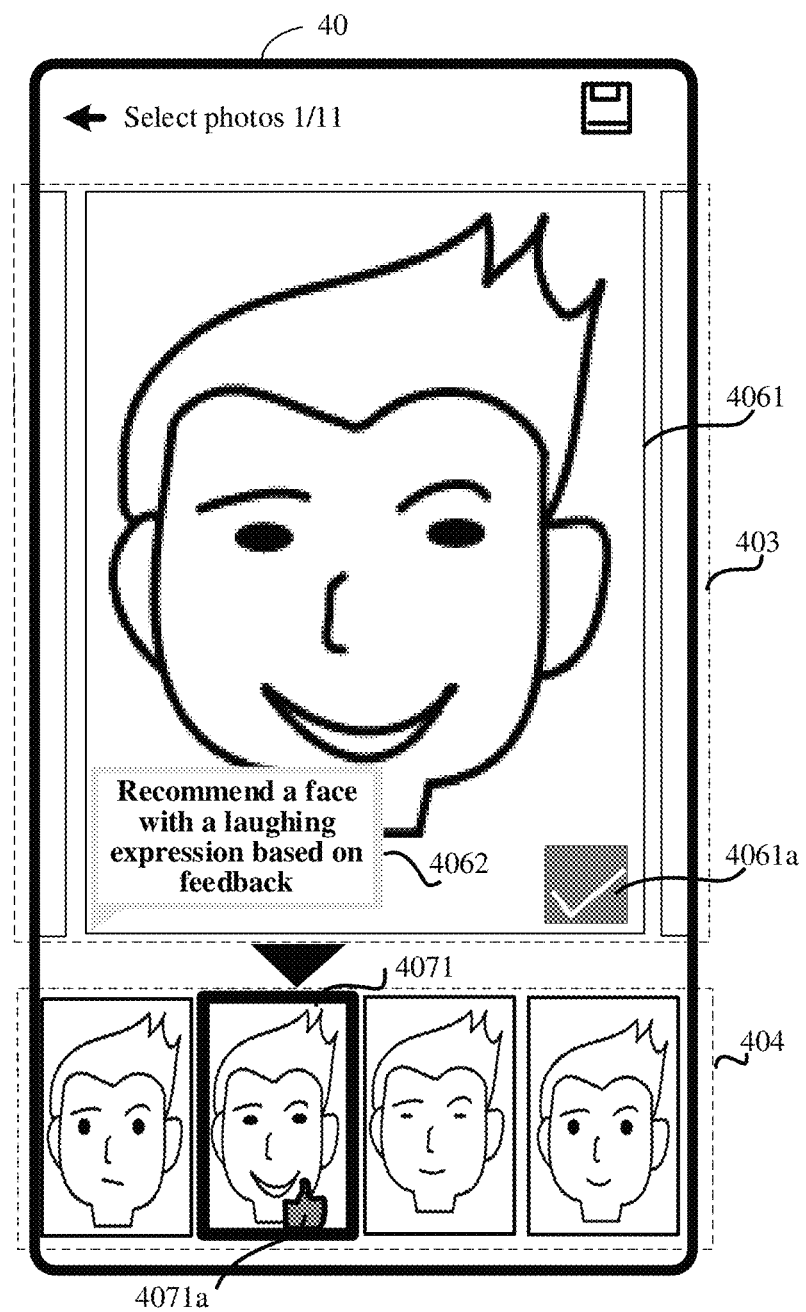

After the parameters of the decision model are adjusted, the electronic device can select, after executing the continuous shooting function next time and according to the adjusted decision model, an optimal image from images obtained through continuous shooting. A first image group may include the images obtained through continuous shooting, and a first image may include an optimal image selected from the first image group according to the adjusted decision model (that is, the updated decision model). Specifically, FIG. 10 is a schematic diagram of a user interface according to an embodiment of this application. As shown in FIG. 10, an optimal image 4061 may be displayed in the image display region 403 by default, and as shown in FIG. 10, the optimal image 4061 includes a selected identifier 4061*a* by default, which indicates that the optimal image 4061 is selected. The user can touch and slide left or right in the image display region 403 to view another image in the images obtained through continuous shooting. In response to a touch sliding operation acting on the image display region 403, the electronic device may display more images in the image display region 403. The thumbnail display region 404 may include thumbnails of 11 images obtained through continuous shooting. A thumbnail 4071 of the optimal image 4061 may include a recommendation identifier 4071*a*.

As shown in FIG. 10, the first image group includes a group of images that can be displayed in the image display region 403, and the first image may include the optimal image 4061. In an image selection scenario in continuous shooting, a third user operation used for displaying the first image group may include, for example, the user operation acting on the control 307 in (A) of FIG. 2. A continuous shooting image interface may include, for example, the user interface 40 described in FIG. 10.

Through the examples described in FIG. 3 and FIG. 4, the electronic device may adjust the parameters of the decision model according to the changed optimal image obtained through continuous shooting, reduce a weight of the "smiling" image feature in the decision model, and increase a weight of the "laughing" image feature, to obtain the adjusted decision model. In this embodiment of this application, when the electronic device selects, according to the adjusted decision model, from the 11 images obtained through continuous shooting, the electronic device can select an image that includes the "laughing" image feature, that is, the image corresponding to the thumbnail 4071. The electronic device displays the image 4061 corresponding to the thumbnail 4071 in the image display region 4061. In this embodiment of this application, the image including the "laughing" image feature is selected according to the user feedback, which is more in line with user habits and preferences, thereby improving the accuracy of recommending images to the user.

In some other embodiments of the embodiments of this application, as shown in FIG. 10, the electronic image display region 403 may further include a prompt 4062, which may prompt that "Recommend a face with a laughing expression based on feedback".

Figure 11A:
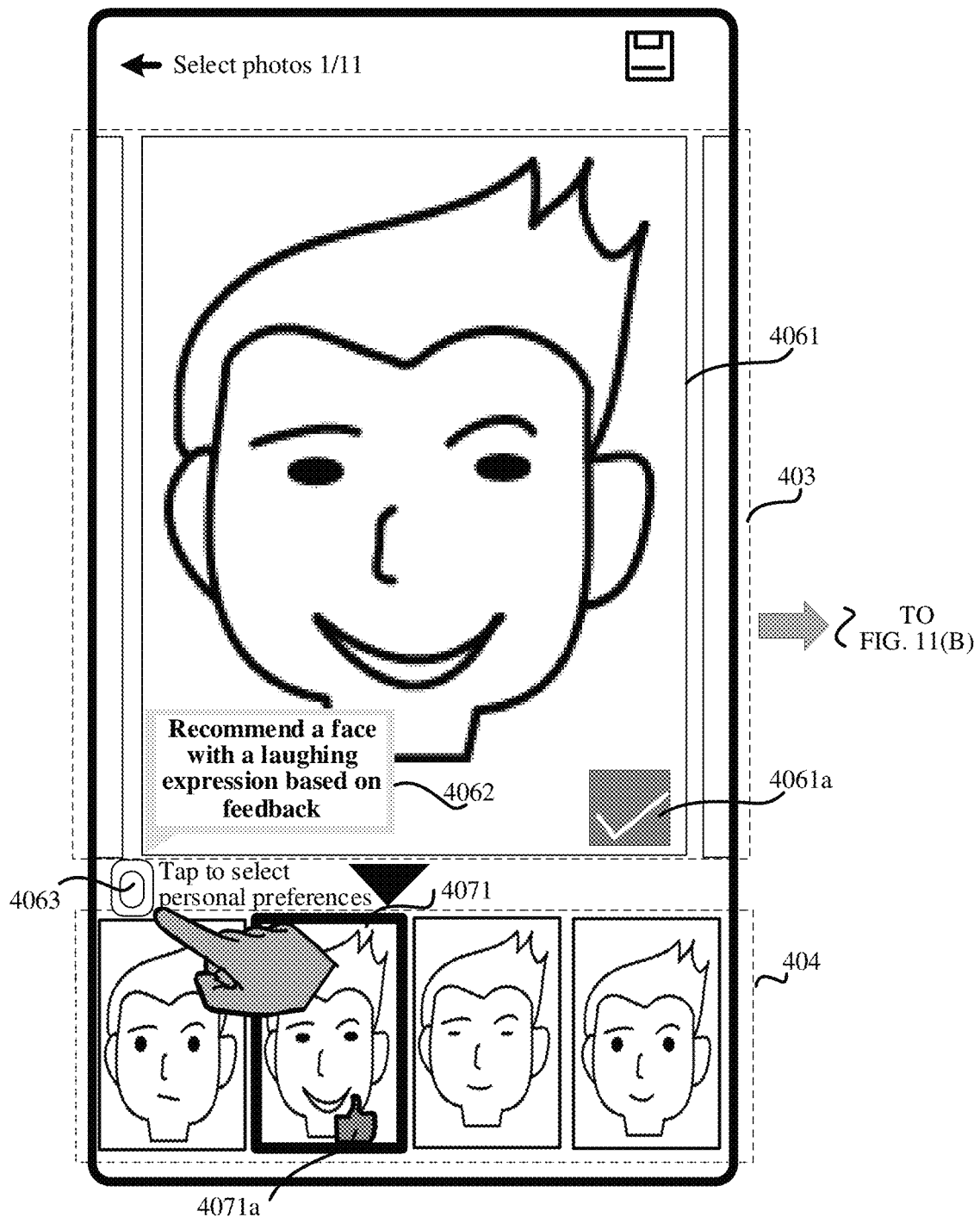
Figure 11B:
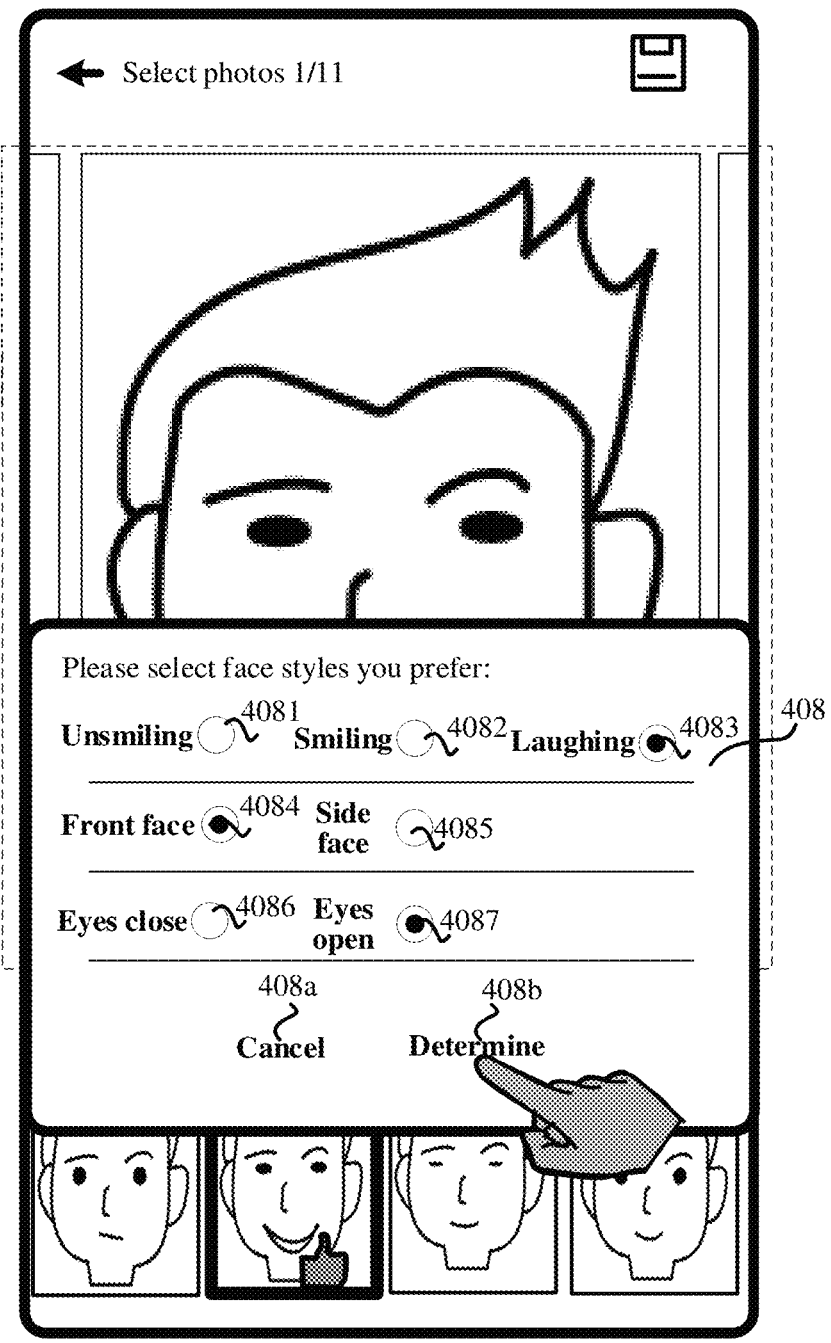

In some other embodiments of this application, the electronic device may receive a user input for adjusting a feature weight. Exemplarily, referring to FIG. 11(A) and FIG. 11(B) as shown in FIG. 11(A), the electronic device further displays a control 4063 on the user interface 40, to prompt that "Tap to select personal preferences". As shown in FIG. 11(B), in response to a user operation acting on the control 4063, the electronic device may display a prompt box 408. The prompt box 408 may be referred to as a second user interface.

The prompt box 408 includes a plurality of image feature options: one set of options is an unsmiling option 4081, a smiling option 4082, and a laughing option 4083, another set of options is a front-face option 4084 and a side-face option 4085, and still another set of options is an eyes-closed option 4086 and an eyes-open option 4087. Each option may include a selected state and an unselected state. The electronic device may switch and display the status of an option as a selected state or an unselected state in response to a user operation, for example, a touch operation, acting on the option.

When the unsmiling option 4081 is in a selected state, a weight corresponding to an "unsmiling" image feature may be increased, and when the unsmiling option 4081 is in an unselected state, the weight corresponding to the "unsmiling" image feature may be reduced. The smiling option 4082 corresponds to a "smiling" image feature, and the laughing option 4083 corresponds to a "laughing" image feature. The front-face option 4084 corresponds to a "front face" image feature, and the side-face option 4085 corresponds to a "side face" image feature. The eyes-closed option 4086 corresponds to an "eyes-closed" image feature, and the eyes-open option 4087 corresponds to an "eyes-open" image feature. The smiling option 4082, the laughing option 4083, the front-face option 4084, the side-face option 4085, the eyes-closed option 4086, and the eyes-open option 4087 are similar. When the option is in a selected state, a weight corresponding to an image feature may be increased, and when the option is in an unselected state, the weight corresponding to the image feature may be reduced.

The prompt box 408 further includes a cancel control 408*a* and a determining control 408*b*. The cancel control 408*a* is configured to return to an upper-level interface. In response to a user operation, for example, a touch operation, acting on the cancel control 408*a*, the electronic device may display the interface shown in FIG. 11(A).

The determining control 408*b* is configured to determine an image feature whose weight needs to be adjusted. In response to a user operation, for example, a touch operation, acting on the determining control 408*b*, the electronic device may obtain an option, for example, the laughing option 4083, the front-face option 4084, or the eyes-open option 4087, that is in a selected state. The user operation, for example, a touch operation, acting on the determining control 408*b*, may be referred to as a sixth user operation.

The electronic device may determine, according to the option in a selected state, the image feature whose weight needs to be adjusted. For example, the electronic device determines that image features whose weights need to be adjusted are the "laughing" image feature, the "front face" image feature, and the "eyes-open" image feature. The "laughing" option 4083, the "front-face" option 4084, and the "eyes-open" option 4087 may be referred to as first options. The first option may be displayed from an unselected state to a selected state in response to a fifth user operation, for example, a touch operation, acting on the first option. Next, the electronic device increases the weights of the image features. The image features are selected by the user according to personal preferences, and are more in line with user habits, so that manual reselection from the plurality of images by the user is reduced, thereby improving convenience.

It can be understood that this embodiment of this application is not limited to the option examples shown in FIG. 11(B), and may further include other options. In addition, this embodiment of this application is not limited to a portrait scene. In another shooting scene, the electronic device can also recognize the shooting scene and provide feature options for users to choose.

Figure 12:
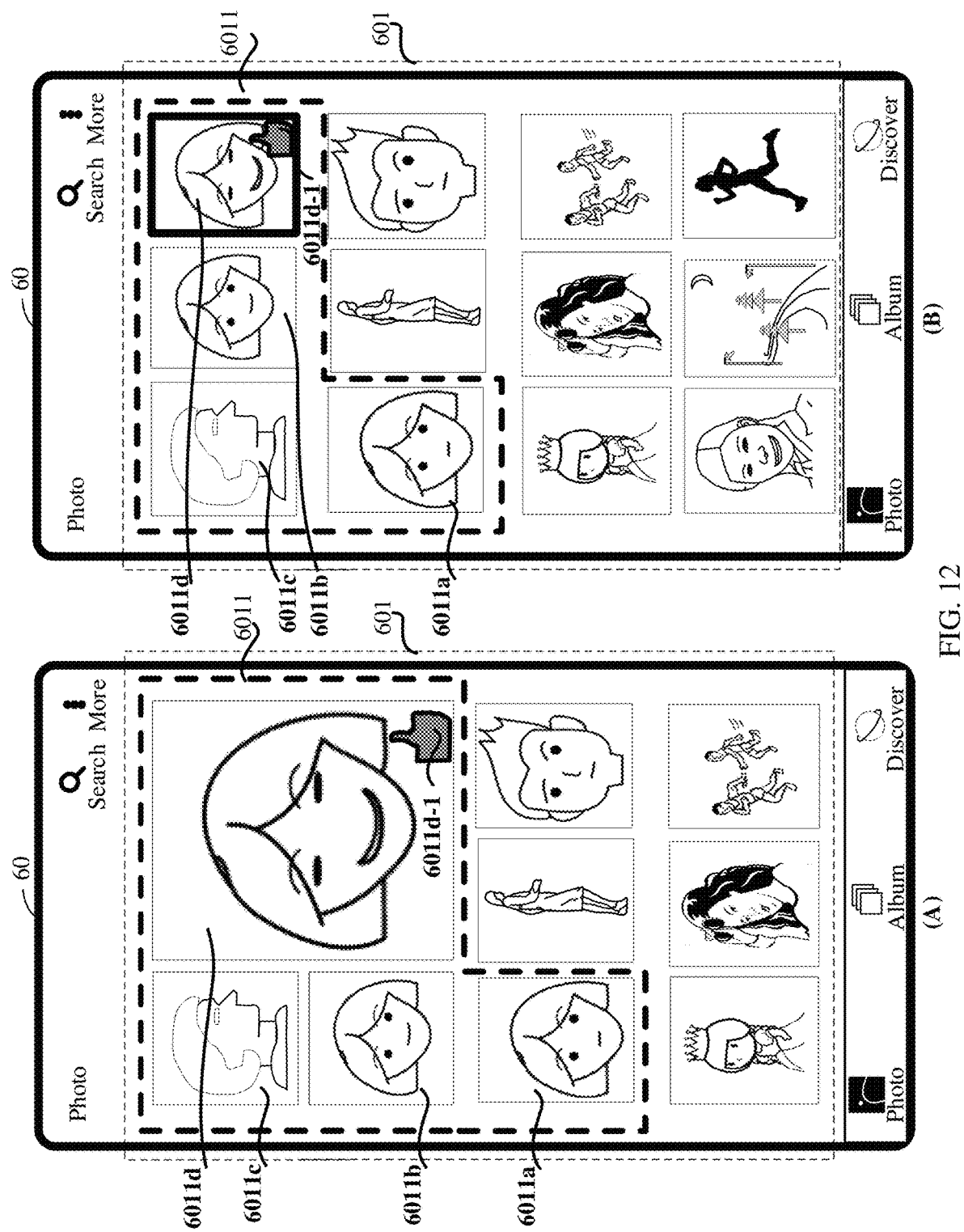

In some embodiments of this application, the electronic device adjusts the parameters of the decision model according to the user feedback to obtain the adjusted decision model. The electronic device can further select an optimal image from the images in the gallery according to the adjusted decision model, and display the optimal image in a distinguishable manner from other images. Specifically, FIG. 12 is a schematic diagram of a user interface according to an embodiment of this application. As shown in (A) of FIG. 12, when the electronic device stores a plurality of face images, the plurality of face images may be displayed, on the user interface 60 corresponding to the gallery, in the form of thumbnails, that is, the thumbnail 6011, which includes thumbnails 6011a, 6011b, 6011c, and 6011d. The plurality of face images may be the first image group and may include the same image feature, for example, the same facial feature, that is, a second facial feature. The first image group is not limited to including the same facial feature, and may alternatively include the same shooting scene, for example, a first shooting scene. The first shooting scene is, for example, a landscape shooting scene.

As shown in (A) of FIG. 12, the electronic device may detect a fourth user operation, for example, a touch operation, acting on a gallery icon, and display a gallery application interface 60. For the gallery icon, reference may be made to the example described in 1.

The electronic device may select an image from an image corresponding to the thumbnail 6011a, an image corresponding to the thumbnail 6011b, an image corresponding to the thumbnail 6011c, and an image corresponding to the thumbnail 6011d according to the adjusted decision model. For example, the electronic device selects the image corresponding to the thumbnail 6011d, and displays the thumbnail 6011d in a larger size than that of the thumbnail 6011a.

Exemplarily, through the examples described in FIG. 3 and FIG. 4, the electronic device may adjust the parameters of the decision model according to the changed optimal image obtained through continuous shooting, reduce a weight of the "smiling" image feature in the decision model, and increase a weight of the "laughing" image feature, to obtain the adjusted decision model. In this embodiment of this application, when the electronic device performs, according to the adjusted decision model, selection from the images corresponding to the thumbnail 6011, the electronic device may select an image that includes the "laughing" image feature, that is, the image corresponding to the thumbnail 6011d, and display the thumbnail 6011d in a larger size.

Optionally, the electronic device may further display a recommendation identifier 6011d-1 on the thumbnail 6011d, to indicate that the image corresponding to the thumbnail 6011d is an optimal image selected from a plurality of images.

In another possible implementation, as shown in (B) of FIG. 12, the thumbnail 6011d of the image selected by the electronic device according to the adjusted decision model may also has the same size as other thumbnails but has different frames from the other thumbnails to indicate that the image corresponding to the thumbnail 6011d is an optimal image selected from the plurality of images. The form of indicating a selected optimal image is not limited in the embodiments of this application.

Weight adjustment is not limited to the "smiling" image feature and the "laughing" image feature in the face image scene, but may also be performed on other image features, such as the "front face" image feature, the "side face" image feature, the "eyes-open" image feature, the "eyes-closed" image feature, and a "laughing eyes" image feature. Weight adjustment may also be performed on image features in other scenes, for example, a depth of field of an image in a macro shooting scene of a bee or a butterfly, or in another example, the composition of an image in a landscape shooting scene. The image features include image semantic features, shooting scenes, or image parameters. Weight adjustment is not limited to such image semantic features, but may also be performed on image parameters, for example, sharpness, illumination uniformity, contrast, saturation, brightness, richness of details, whether it is overexposed or too dark, whether there is a color block, whether there is a color cast, and whether it is too cold. Image features on which weight adjustment is performed are not limited in the embodiments of this application.

In a gallery scene, as shown in FIG. 12, the first image group may further include the images respectively corresponding to thumbnails 6011a, 6011b, 6011c, and 6011d. Correspondingly, the first image may include an optimal image, that is, the image corresponding to the thumbnail 6011d.

Figure 13:
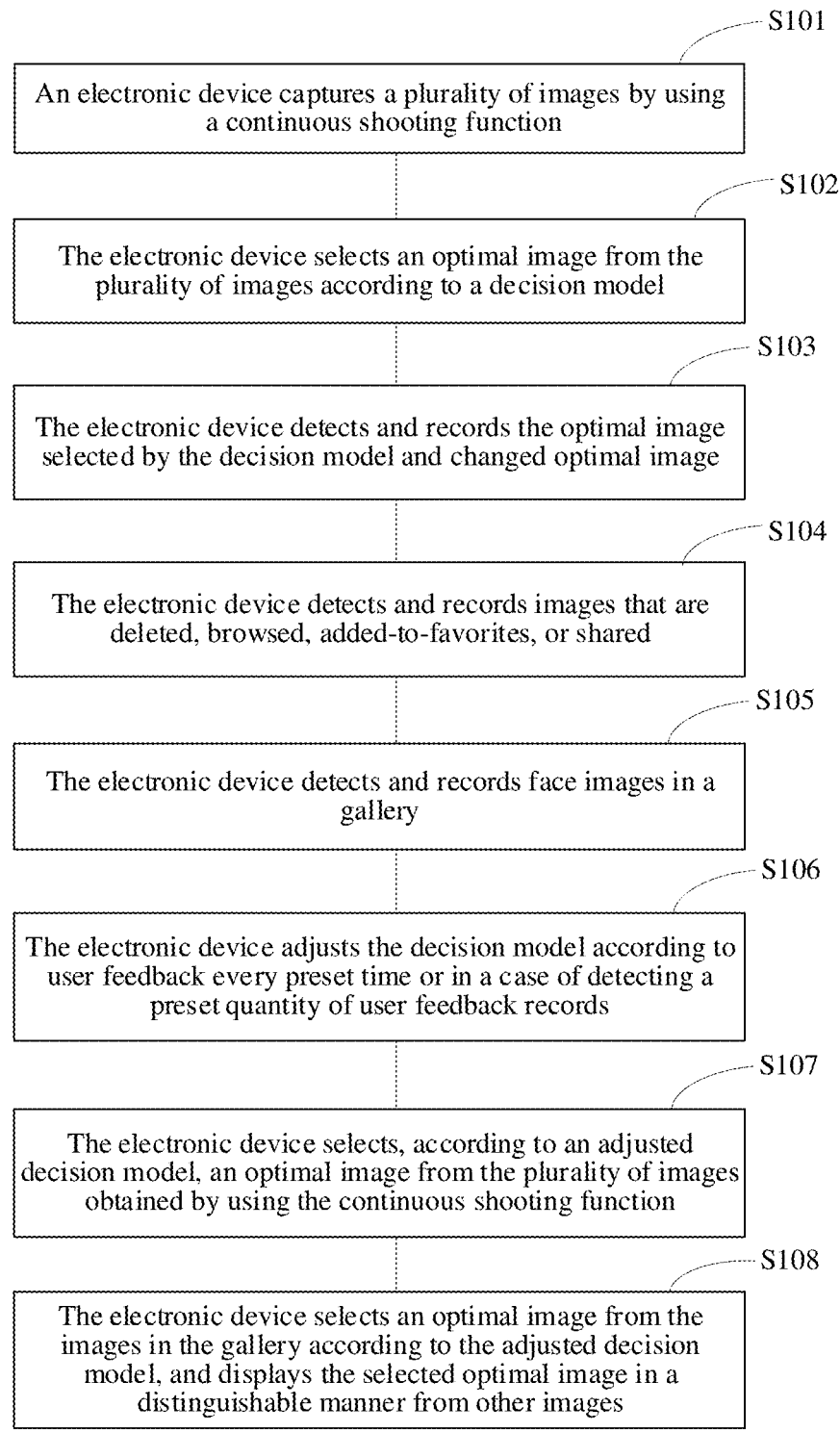
FIG. 13 is a flowchart of a method for adjusting parameters of a decision model according to an embodiment of this application.

A process of adjusting the parameters of the decision model by the electronic device in this embodiment of this application is specifically described below. FIG. 13 is a flowchart of a method for adjusting parameters of a decision model according to an embodiment of this application. As shown in FIG. 13, the method includes steps S101 to S108:

S101: An electronic device captures a plurality of images by using a continuous shooting function.

S102: The electronic device selects an optimal image from the plurality of images according to a decision model.

S103: The electronic device detects and records the optimal image selected by the decision model and a changed optimal image.

For steps S101 to S103, reference may be made to the related descriptions of the user interfaces provided in FIG. 1(A) and FIG. 1(B) to FIG. 4, and details are not described herein again.

S104: The electronic device detects and records images that are deleted, browsed, added-to-favorites, or shared.

For the images that are deleted, browsed, added-to-favorites, or shared, reference may be made to the related descriptions of the user interfaces provided in FIG. 5 to FIG. 8, and details are not described herein again.

In this embodiment of this application, the user feedback is not limited to the images that are deleted, browsed, added-to-favorites, or shared, but may further include images that are edited, printed, annotated, and reminded.

S105: The electronic device detects and records face images in a gallery.

For face images in the gallery, reference may be made to the related descriptions of the user interface provided in FIG. 9, and details are not described herein again. In this embodiment of this application, the face images in the gallery may be further updated according to the update of captured images.

In this embodiment of this application, the user feedback is not limited to face images in a face image scene, but may further include a photographed object in another scene.

An execution sequence of steps S103, S104, and S105 is not limited in this embodiment of this application.

S106: The electronic device adjusts parameters of the decision model according to the user feedback every preset time or in a case of detecting a preset quantity of user feedback records.

S107: The electronic device selects, according to an adjusted decision model, an optimal image from the plurality of images obtained by using the continuous shooting function.

S108: The electronic device selects an optimal image from the images in the gallery according to the adjusted decision model, and displays the selected optimal image in a distinguishable manner from other images.

For steps S107 and S108, reference may be made to the related descriptions of the user interfaces provided in FIG. 10 to FIG. 12, and details are not described herein again.

In this embodiment of this application, the decision model may include any one or more of the following parameters: 1. different image features between the optimal image selected by the decision model and the changed optimal image; 2. image features that are deleted, browsed, added-to-favorites, or shared; 3. image features of the face images in the gallery. The decision model also includes weights corresponding to the included parameters. A process of adjusting the parameters of the decision model in S106 is specifically described below.

1. A Process of Adjusting the Parameters of the Decision Model Through Image Selection in Continuous Shooting The electronic device may detect the different image features between the optimal image selected by the decision model and the changed optimal image. For example, the electronic device may detect that the optimal image selected by the decision model includes a "smiling" image feature, and the changed optimal image includes a "laughing" image feature. The electronic device increases a weight of the "laughing" image feature in the decision model, and reduces a weight of the "smiling" image feature. When the adjusted decision model is used to perform image selection in continuous shooting in a portrait scene, the electronic device may select an image that includes the "laughing" image feature.

In another example, in a landscape shooting scene, the electronic device may detect that the optimal image selected by the decision model includes an image feature of a diagonal composition, and the changed optimal image includes an image feature of a central composition. The electronic device increases a weight of the image feature of the central composition in the decision model, and reduces a weight of the image feature of the diagonal composition. When the adjusted decision model is used to perform image selection in continuous shooting in a landscape shooting scene, the electronic device may select an image that includes the image feature of the central composition.

For a weight of an image feature, reference may be made to the foregoing related descriptions of the deep neural network concept.

In this embodiment of this application, the electronic device may input a tag value (for example, a value) indicating the first user operation, the optimal image (the second image) selected by the decision model, and the changed optimal image (the third image) into the decision model. The decision model may be adjusted according to the tag indicating the first user operation, the second image, and the third image.

2. A Process of Adjusting the Parameters of the Decision Model by Using the Images that are Deleted, Browsed, Added-to-Favorites, or Shared The electronic device may periodically (for example, every 24 hours) record quantities of times of deleting, browsing, adding-to-favorites, or sharing images in the gallery. The electronic device may respectively set corresponding tag values for deletion, browsing, adding-to-favorites, or sharing. Next, the electronic device may recognize a shooting scene of an operated image, and adjust a weight of a corresponding image feature according to the operated image and a tag value corresponding to the image. An example of tag values corresponding to user operations is provided below.

TABLE 1

An example of tag values corresponding to image operations

| User operation | Tag value |
|---|---|
| Delete | 0 |
| Browse/times | 1 |
| Favorite | 2 |
| Share/times | 3 |

As shown in Table 1, when an image receives a delete operation, the electronic device assigns a tag value of 0 to the image. When an image receives a browse operation, the electronic device assigns a tag value of 1 to the image. If an image is viewed for a plurality of times, a tag value is a product of 1 and a quantity of times. When an image receives an adding-to-favorites operation, the electronic device assigns a tag value of 2 to the image. When an image receives a sharing operation, the electronic device assigns a tag value of 3 to the image. If an image is shared for a plurality of times, a tag value is a product of 3 and a quantity of times.

For example, within 24 hours of a statistical period, an image a, an image b, and an image c are all in portrait scenes. The image a includes an "unsmiling" image feature. When the image a receives a delete operation, a tag value 0 is assigned to the image a. The image b includes a "smiling" image feature. When the image b receives two browse operations, a tag value 2 is assigned to the image a. The image c includes a "laughing" image feature. After the image c receives two sharing operations, a tag value 6 is assigned to the image c.

The electronic device may adjust the parameters of the decision model according to the images that are deleted, browsed, added-to-favorites, or shared and corresponding tag values. The tag value may indicate a user operation performed on an image. Specifically, the tag value may be in direct proportion to a weight corresponding to an image feature of the image. That is, a larger tag value indicates a larger weight of the image feature corresponding to the image, and a smaller tag value indicates a smaller weight of the image feature corresponding to the image. Exemplarily, the tag value of the image a is 0, and the electronic device may reduce a weight of the "unsmiling" image feature included in the image a. The tag value of the image b is 2, and the electronic device may remain a weight of the "smiling" image feature included in the image b unchanged. The tag value of the image c is 6, and the electronic device may increase a weight of the "laughing" image feature included in the image c. When the adjusted decision model is used to perform image selection in continuous shooting in a portrait scene, the electronic device may select an image that includes the "laughing" image feature.

This embodiment of this application is described by using a portrait scene as an example. However, image features in this embodiment of this application are not limited to image features corresponding to a portrait scene, but may also be image features corresponding to other scenes, for example, a composition feature in a landscape shooting scene. A specific shooting scene and specific image features are not limited in this embodiment of this application.

It is not limited to adjusting the parameters of the decision model periodically according to images that are deleted, browsed, added-to-favorites, or shared, the electronic device may also adjust the parameters of the decision model when a quantity of images that are deleted, browsed, added-to-favorites, or shared reaches a specified quantity.

3. A Process of Adjusting the Parameters of the Decision Model by Using the Face Images in the Gallery The decision model may further include a plurality of facial features and weights corresponding to the facial features. The electronic device may detect a facial expression score of an image by using the decision model, for example, obtain a facial expression score through face recognition. Each facial feature corresponds to a face image. The electronic device may count a quantity (or a proportion) of images that correspond to each face image in the gallery, that is, count a quantity (or a proportion) of images in the gallery that correspond to each facial feature. The electronic device adjusts the weight of the facial feature in the decision model according to the quantity of corresponding images. Specifically, a greater quantity of corresponding images in the gallery indicates a greater weight of a first facial feature, and a smaller quantity of corresponding images in the gallery indicates a smaller weight of the first facial feature. A larger proportion of images including the first facial feature in the gallery indicates a greater weight of the first facial feature, and a smaller proportion of images including the first facial feature in the gallery indicates a smaller weight of the facial feature. The proportion of images including the first facial feature in the gallery refers to a proportion of a quantity of images including the first facial feature in all images in the gallery.

In this embodiment of this application, the first facial feature is a facial feature corresponding to the largest quantity of images in the gallery that include the facial feature, and the gallery includes images stored in the electronic device. The stored images include, for example, images captured by a camera. The stored images may further include images downloaded locally and images that are received, sent, added-to-favorites, edited, printed, and annotated in an application (such as WeChat).

For the decision model, a greater facial expression score of an image indicates a greater probability that the image is selected as an optimal image. A greater weight of a facial feature indicates a greater probability that an image including the facial feature is selected as an optimal image. For a portrait scene including a plurality of faces, that is, a captured image including a plurality of face images, a weight of a facial feature corresponding to a greater quantity of corresponding images in the gallery is adjusted to greater by the electronic device. The electronic device performs image selection in continuous shooting based on the adjusted decision model, to obtain an optimal image. The optimal image may include a face image corresponding to the largest quantity of images in the gallery, and the face image has the highest expression score. For example, a facial feature a indicates a face image of Lisa, a facial image B indicates a face image of Rechel, and a facial image C indicates a face image of Kate. The electronic device obtains through face recognition that the images in the gallery include the face image A, the face image B, and the face image C, and detects a quantity of images that correspond to each face image in the gallery. The face image A, the face image B, and the face image C respectively correspond to a facial feature a, a facial feature b, and a facial feature c. Specifically, a quantity of images that correspond to the face image A in the gallery is 50, that is, the 50 images all include the face image A, that is, include the facial feature a. A quantity of images that correspond to the face image B (the facial feature b) in the gallery is 30, and a quantity of images that correspond to the face image C (the facial feature c) in the gallery is 10. When the electronic device adjusts the parameters of the decision model according to the face images in the gallery, a weight of the facial feature a that corresponds to the face image A is adjusted to largest, a weight of the facial feature b that corresponds to the face image B is adjusted to the second largest, and a weight of the facial feature c that corresponds to the face image C is adjusted to smallest. The electronic device performs image selection in continuous shooting based on the adjusted decision model, to obtain an optimal image.

Optionally, the adjusted decision model may alternatively include only the facial feature a corresponding to the face image A and the facial feature b corresponding to the face image B. When the electronic device adjusts the parameters of the decision model according to the face images in the gallery, the weight of the facial feature a that corresponds to the face image A is adjusted to largest, and the weight of the facial feature b that corresponds to the face image B is adjusted to smallest.

In this embodiment of this application, the first facial feature may be a facial feature corresponding to the largest quantity of images in the gallery that include the facial feature. For example, there may be a plurality of first facial features in the foregoing example, including the facial feature a corresponding to the largest quantity of images in the gallery that include the facial feature a and the facial feature b corresponding to the largest quantity of images in the gallery that include the facial feature b, that is, the facial feature a corresponding to the face image of Lisa and the facial feature b corresponding to the face image of Rechel.

A specific algorithm used to obtain a facial expression score through face recognition is not limited in this embodiment of this application. Specifically, the electronic device may determine a facial expression score by using an image semantic feature and/or an image parameter. For example, a face detected by the electronic device includes a "smiling" image feature and an "eyes-open" image feature, and the sharpness, illumination uniformity, and richness of details all reach a specified threshold, the electronic device may obtain a facial expression score according to detected image semantic features and image parameters. Not limited to the above examples, a facial expression score may also be determined according to the composition of a face image in an image.

Optionally, the adjusted decision model may alternatively include facial expression scores respectively corresponding to the face images and corresponding weights. A process of updating the decision model may be to increase a weight that is of a facial expression score of a face image (for example, the face image A in the foregoing example and the facial feature corresponding to the face image A) and that is in the decision model. When the updated decision model obtained by increasing the weight that is of the facial expression score of the face image A and that is in the decision model is used for image selection, the electronic device may select an image with the highest facial expression score of the face image A from a group of images according to the updated decision model.

The electronic device adjusts the parameters of the decision model by using the face images in the gallery, and uses the adjusted decision model to perform image selection in continuous shooting in a portrait scene to obtain an optimal image. The optimal image may include a face image corresponding to the largest quantity of images in the gallery, and the face image has the highest expression score. In this way, the selected image is more in line with user habits, so that manual reselection from the plurality of images by the user is reduced, thereby improving convenience.

In some other embodiments of this application, the electronic device obtains the face images in the gallery through face recognition. The electronic device may alternatively adjust, after a user operation of enabling the continuous shooting function is detected, for example, when the long-press operation acting on the photographing control 202 shown in FIG. 1(B) ends, the parameters of the decision model according to the face images in the gallery, and select the optimal image in the images that are obtained through this continuous shooting according to the adjusted decision model. Exemplarily, when it is detected that a plurality of images are obtained by enabling the continuous shooting function, the electronic device may obtain three face images each with the largest quantity of images in the gallery that include the face image. The electronic device may detect whether any of the three face images is included in the plurality of images obtained through continuous shooting. If any of the three face images is included in the plurality of images obtained through continuous shooting, the electronic device may increase weights of facial features in the decision model that correspond to the three face images. The electronic device selects an optimal image from the plurality of images by using an adjusted decision model, and the three face images in the optimal image have the highest expression scores.

The face images in the gallery and a quantity of images that correspond to each face image vary according to the accumulation of acquired images. Therefore, the parameters of the decision model are adjusted in real time after the continuous shooting function is executed, which can improve the accuracy of image selection in continuous shooting performed by the adjusted decision model.

In this embodiment of this application, in addition to the facial expression score, the adjusted decision model may further determine a portrait body proportion corresponding to a face image. Specifically, the electronic device adjusts the parameters of the decision model by using the face images in the gallery, and uses the adjusted decision model to perform image selection in continuous shooting in a portrait scene to obtain an optimal image. The optimal image may include a face image corresponding to the largest quantity of images in the gallery, and the face image corresponds to the highest portrait body proportion score.

Similar to a facial expression score, the electronic device may further determine a portrait body proportion score of a face image by using an image semantic feature and/or an image parameter. For example, the electronic device detects features of various parts of a complete portrait of a specific face image (such as an "arm" image feature and a "leg" image feature), and then calculates a body proportion score of the complete portrait according to the various parts of the complete figure. The electronic device may further determine a body proportion score of a complete portrait according to another algorithm. This is not limited to the foregoing examples.

In this embodiment of this application, the user feedback may be used as training samples to train the decision model to obtain the adjusted decision model. The decision model may be obtained through training by using an original training sample set, and the original training sample set may include a plurality of images. The electronic device may use the user feedback as a new training sample set to retrain the decision model to obtain the adjusted decision model.

In this embodiment of this application, the processes of adjusting the parameters of the decision model described in 1, 2, and 3 may be performed separately, or two or more update processes may be performed in a process of adjusting the parameters of the decision model at one time. This is not limited in this embodiment of this application.

Figure 14:
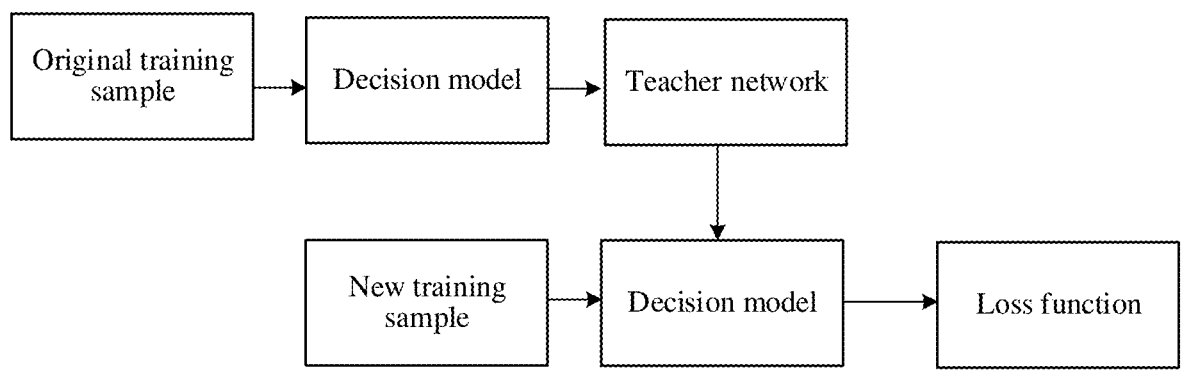
FIG. 14 is a schematic diagram of the principle of decision model training according to an embodiment of this application.

Specifically, FIG. 14 is a schematic diagram of the principle of decision model training according to an embodiment of this application. FIG. 14 provides an example of obtaining the adjusted decision model through training in a knowledge distillation manner. The electronic device trains a decision model by using an original training sample set. A decision model obtained through training may be used as a teacher network. The electronic device may use some features of the teacher network in a process of training an adjusted decision model. Specifically, the electronic device may perform a softmax transformation on the teacher network to obtain a soft target. The soft target may represent some features of the original training sample set, and is used for training the decision model to obtain the adjusted decision model. As shown in FIG. 14, the electronic device can train the decision model by using the soft target and a new training sample set together, to obtain the adjusted decision model. A training process may be implemented by using a back propagation algorithm, that is, performing training by using a method for back propagating a loss function. For details, reference may be made to the concept description part, and details are not described herein again.

It can be understood that the decision model training process is described in this embodiment of this application by using knowledge distillation as an example. However, in this embodiment of this application, the decision model is not limited to being trained in the knowledge distillation manner, but may be trained in another manner.

An exemplary electronic device 100 provided in an embodiment of this application is described first below.

Figure 15:
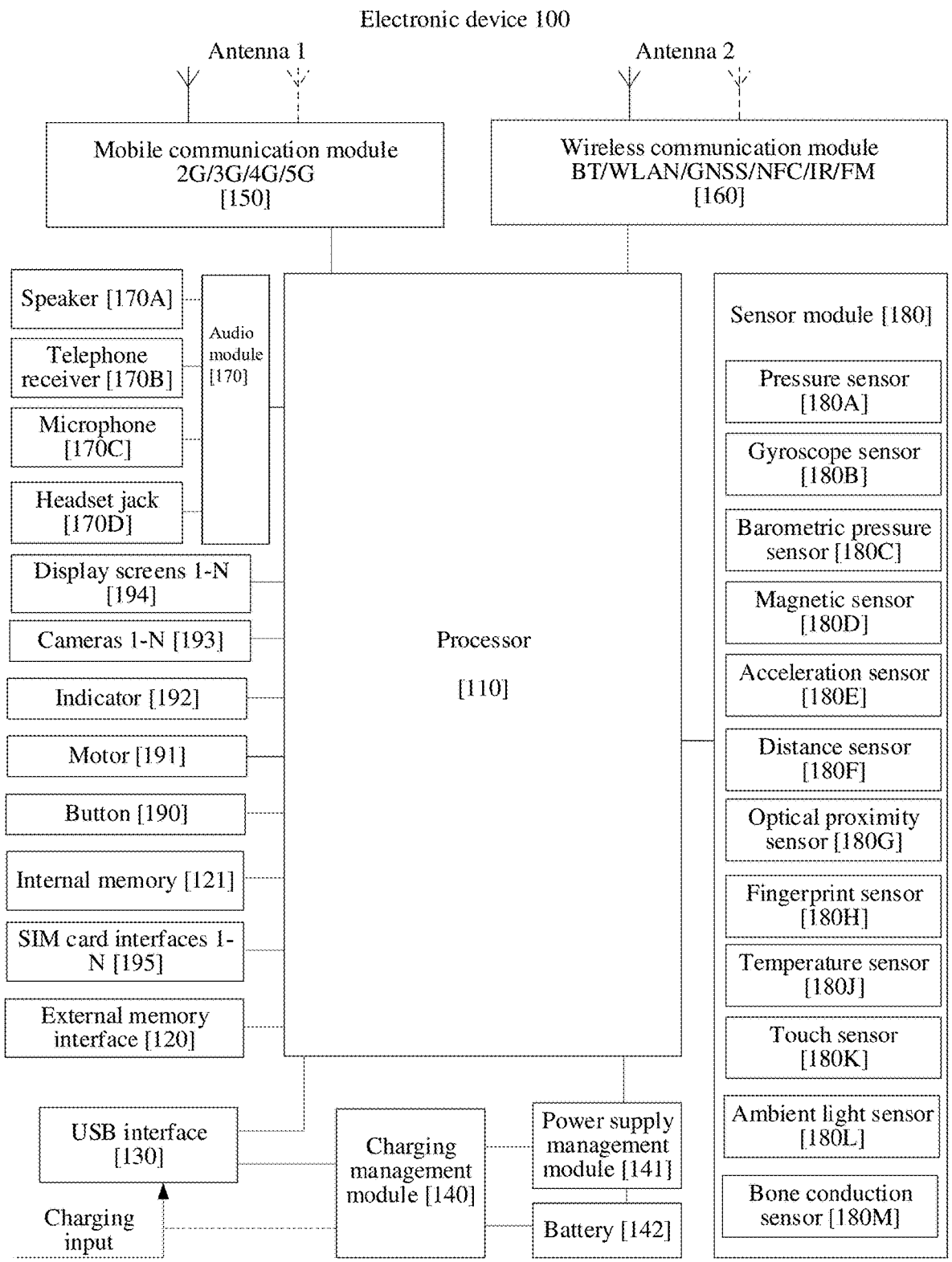
FIG. 15 is a schematic structural diagram of an electronic device 100 according to an embodiment of this application.

FIG. 15 is a schematic structural diagram of an electronic device 100 according to an embodiment of this application.

The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, and an audio module 170, a speaker 170A, a telephone receiver 170B, a microphone 170C, a headset jack 170D, a sensor module 180, a button 190, a motor 191, an indicator 192, a camera 193, a display screen 194, a subscriber identity module (subscriber identity module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, and a touch sensor 180K, an ambient light sensor 180L, a bone conduction sensor 180M, and the like.

It may be understood that an example structure in this embodiment of the present invention does not constitute a specific limitation on the electronic device 100. In some other embodiments of this application, the electronic device 100 may include more or fewer components than those shown in the figure, or some components may be combined, or some components may be divided, or different component arrangements may be used. The components in the portrait may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the electronic device 100. The controller may generate an operation control signal based on an instruction operation code and a timing signal, and read an instruction and control execution of the instruction.

A memory may be further configured in the processor 110, to store an instruction and data. In some embodiments, the memory in the processor 110 is a cache memory. The memory may store an instruction or data that is recently used or cyclically used by the processor 110. If the processor 110 needs to use the instruction or the data again, the processor 110 may directly invoke the instruction or the data from the memory, to avoid repeated access and reduce a waiting time of the processor 110, thereby improving system efficiency.

In some embodiments, the processor 110 may include one or more interfaces. The interface may include an integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a bidirectional synchronous serial bus, including a serial data line (serial data line, SDA) and a serial clock line (serial clock line, SCL). In some embodiments, the processor 110 may include a plurality of groups of I2C buses. The processor 110 may be coupled to the touch sensor 180K, a charger, a flash, the camera 193, and the like by using different I2C bus interfaces respectively. For example, the processor 110 may be coupled to the touch sensor 180K by using the I2C interface, so that the processor 110 communicates with the touch sensor 180K by using the I2C bus interface, to implement a touch function of the electronic device 100.

The I2S interface may be used for audio communication. In some embodiments, the processor 110 may include a plurality of groups of I2S buses. The processor 110 may be coupled to the audio module 170 by using the I2S bus, to implement communication between the processor 110 and the audio module 170. In some embodiments, the audio module 170 may transfer an audio signal to the wireless communication module 160 by using the I2S interface, to implement a function of answering a call by using a Bluetooth headset.

The PCM interface may also be used for audio communication, and sampling, quantization, and encoding of an analog signal. In some embodiments, the audio module 170 may be coupled to the wireless communication module 160 by using the PCM bus interface. In some embodiments, the audio module 170 may alternatively transfer an audio signal to the wireless communication module 160 by using the PCM interface, to implement the function of answering a call by using a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 by using a UART interface, to implement a Bluetooth function. In some embodiments, the audio module 170 may transfer an audio signal to the wireless communication module 160 by using a UART interface, to implement a function of playing music by using a Bluetooth headset.

The MIPI interface may be configured to connect the processor 110 to a peripheral device such as the display screen 194 and the camera 193. The MIPI interface includes a camera serial interface (camera serial interface, CSI), a display serial interface (display serial interface, DSI), and the like. In some embodiments, the processor 110 communicates with the camera 193 by using the CSI interface, to implement a photographing function of the electronic device 100. The processor 110 communicates with the display screen 194 by using a DSI interface, to implement a display function of the electronic device 100.

The GPIO interface may be configured by using software. The GPIO interface may be configured as a control signal, or may be configured as a data signal. In some embodiments, the GPIO interface may be configured to connect the processor 110 to the camera 193, the display screen 194, the wireless communication module 160, the audio module 170, the sensor module 180, and the like. The GPIO interface may alternatively be configured as an I2C interface, an I2S interface, a UART interface, a MIPI interface, or the like.

The USB interface 130 is an interface that conforms to a USB standard specification, and may be specifically a mini USB interface, a micro USB interface, a USB Type C interface, or the like. The USB interface 130 may be configured to connect to the charger to charge the electronic device 100, or may be used for data transmission between the electronic device 100 and a peripheral device, or may be configured to connect to a headset, to play audio by using the headset. The interface may alternatively be configured to connect to another electronic device such as an AR device.

It may be understood that an interface connection relationship between the modules illustrated in this embodiment of the present invention is merely an example for description, and does not constitute a limitation on a structure of the electronic device 100. In some other embodiments of this application, the electronic device 100 may alternatively use an interface connection manner different from that in the foregoing embodiment, or use a combination of a plurality of the interface connection manners.

The charging management module 140 is configured to receive charging input from a charger. The charger may be a wireless charger or a wired charger. In some embodiments of wired charging, the charging management module 140 may receive charging input of a wired charger by using the USB interface 130. In some embodiments of wireless charging, the charging management module 140 may receive wireless charging input by using a wireless charging coil of the electronic device 100. The charging management module 140 may supply power for the electronic device by using the power management module 141 while charging the battery 142.

The power management module 141 is configured to connect to the battery 142, the charging management module 140, and the processor 110. The power management module 141 receives an input of the battery 142 and/or the charging management module 140, to supply power to the processor 110, the internal memory 121, an external memory, the display screen 194, the camera 193, the wireless communications module 160, and the like. The power management module 141 may be further configured to monitor parameters such as a battery capacity, a battery cycle count, and a battery state of health (electric leakage and impedance). In some other embodiments, the power management module 141 may be alternatively disposed in the processor 110. In some other embodiments, the power management module 141 and the charging management module 140 may further be configured in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit or receive an electromagnetic wave signal. Each antenna of the electronic device 100 may be configured to cover one or more communication frequency bands. Different antennas may also be multiplexed to improve utilization of the antennas. For example, an antenna 1 may be multiplexed as a diversity antenna of a wireless local area network. In some other embodiments, the antenna may be used in combination with a tuning switch.

The mobile communications module 150 may provide a solution to wireless communication such as 2G/3G/4G/5G applied to the electronic device 100. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering and amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communication module 150 may be configured in a same device as at least some modules of the processor 110.

The modem processor may include a modulator and a demodulator. The modulator is configured to modulate a to-be-sent low-frequency baseband signal into a medium-high-frequency signal. The demodulator is configured to demodulate the received electromagnetic wave signal into a low-frequency baseband signal. Next, the demodulator transmits the demodulated low-frequency baseband signal to the baseband processor for processing. The low-frequency baseband signal is processed by the baseband processor and then transmitted to an application processor. The application processor outputs a sound signal through an audio device (which is not limited to the speaker 170A, the telephone receiver 170B, and the like), or displays an image or a video through the display screen 194. In some embodiments, the modem processor may be an independent device. In some other embodiments, the modem processor may be independent of the processor 110, and the modem processor and the mobile communications module 150 or another function module may be disposed in a same device.

The wireless communications module 160 may provide a solution to wireless communication applied to the electronic device 100, for example, a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), and an infrared (infrared, IR) technology. The wireless communication module 160 may be one or more devices integrating at least one communication processing module. The wireless communication module 160 receives an electromagnetic wave by using the antenna 2, performs frequency modulation and filtering processing on an electromagnetic wave signal, and sends a processed signal to the processor 110. The wireless communication module 160 may alternatively receive a to-be-sent signal from the processor 110, perform frequency modulation and amplification on the to-be-sent signal, and convert the signal into an electromagnetic wave for radiation by using the antenna 2.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies, and the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS) and/or satellite-based augmentation systems (SBAS).

The electronic device 100 implements a display function by using the GPU, the display screen 194, the application processor, and the like. The GPU is a microprocessor for image processing, and is connected to the display screen 194 and the application processor. The GPU is configured to perform mathematical and geometric calculations and to render graphics. The processor 110 may include one or more GPUs and execute program instructions to generate or change display information.

The display screen 194 is configured to display an image, a video, and the like. The display screen 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), a Miniled, a MicroLed, a Micro-oLed, quantum dot light emitting diodes (quantum dot light emitting diodes, QLED), and the like. In some embodiments, the electronic device 100 may include one or N display screens 194. N is a positive integer greater than 1.

The electronic device 100 can implement a photographing function by using the ISP, the camera 193, the video codec, the GPU, the display screen 194, the application processor, and the like.

The ISP is configured to process data fed back by the camera 193. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may also perform algorithm optimization on image noise point, brightness, and skin tone. The ISP may also optimize parameters such as exposure and color temperature of a shooting scene. In some embodiments, the ISP may be disposed in the camera 193.

The camera 193 is configured to capture a static image or a video. An optical image of an object is generated through a lens and is projected to the photosensitive element. The photosensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in RGB and YUV formats. In some embodiments, the electronic device 100 may include one or N cameras 193, and N is a positive integer greater than 1.

The digital signal processor is configured to process a digital signal, and in addition to a digital image signal, may further process another digital signal. For example, when the electronic device 100 performs frequency selection, the digital signal processor is configured to perform Fourier transform and the like on frequency energy.

The video codec is configured to compress or decompress a digital video. The electronic device 100 may support one or more video codecs. In this way, the electronic device 100 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, quickly processes input information by referring to a structure of a biological neural network, for example, a transmission mode between neurons in a human brain, and may further continuously perform self-learning. The NPU may be used to implement an application such as intelligent cognition of the electronic device 100, for example, image recognition, facial recognition, voice recognition, and text understanding. The NPU may further be used to implement the decision model provided in the embodiments of this application.

The external memory interface 120 may be configured to connect to an external storage card such as a micro SD card, to expand a storage capability of the electronic device 100. The external storage card communicates with the processor 110 by using the external memory interface 120, so as to implement a data storage function, such as storing a file such as music or a video in the external storage card.

The internal memory 121 may be configured to store computer executable program code, and the executable program code includes an instruction. The processor 110 runs the instruction stored in the internal memory 121, to perform various function applications and data processing of the electronic device 100. The internal memory 121 may include a program storage region and a data storage region. The program storage region may store an operating system, an application required by at least one function (for example, a sound playing function or an image playing function), and the like. The data storage region may store data (for example, audio data and an address book) and the like created when the electronic device 100 is used. In addition, the internal memory 121 may include a high-speed random access memory, or may include a non-volatile memory such as at least one magnetic disk memory, a flash memory, or a universal flash storage (universal flash storage, UFS).

The electronic device 100 may implement an audio function such as music playing or recording by using the audio module 170, the speaker 170A, the telephone receiver 170B, the microphone 170C, the headset jack 170D, the application processor, and the like.

The audio module 170 is configured to convert digital audio information into an analog audio signal output, and is further configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "horn", is configured to convert an audio electrical signal into a sound signal. Music can be listened to or a hands-free call can be answered by using the speaker 170A in the electronic device 100.

The telephone receiver 170B, also referred to as a "receiver", is configured to convert an audio electrical signal into a sound signal. When the electronic device 100 is used to answer a call or receive voice information, the telephone receiver 170B may be put close to a human ear, to receive the voice information.

The microphone 170C, also referred to as a "microphone" or a "microphone", is configured to convert a sound signal into an electrical signal. When making a call or sending voice information, a user may speak with the mouth approaching the microphone 170C, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may be alternatively disposed in the electronic device 100, to collect a sound signal, implement noise reduction, recognize a sound source, implement a directional recording function, and the like.

The headset jack 170D is configured to connect to a wired headset. The headset jack 170D may be a USB interface 130, or may be a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed in the display screen 194. There are a plurality of types of pressure sensors 180A, for example, a resistive pressure sensor, an inductive pressure sensor, and a capacitive pressure sensor. The capacitive pressure sensor may include at least two parallel plates having conductive materials. When force is exerted on the pressure sensor 180A, capacitance between electrodes changes. The electronic device 100 determines strength of pressure based on a change of the capacitance. When a touch operation is performed on the display screen 194, the electronic device 100 detects strength of the touch operation by using the pressure sensor 180A. The electronic device 100 may further calculate a position of the touch based on a detection signal of the pressure sensor 180A. In some embodiments, touch operations that are performed on a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation strength is greater than or equal to the first pressure threshold is performed on the SMS message application icon, an instruction of creating a new SMS message is executed.

The gyroscope sensor 180B may be configured to determine a motion posture of the electronic device 100. In some embodiments, an angular velocity of the electronic device 100 around three axes (i.e., x, y, and z axes) may be determined through the gyroscope sensor 180B. The gyro sensor 180B may be used for image stabilization during photographing. Exemplarily, when the shutter is pressed, the gyro sensor 180B detects an angle at which the electronic device 100 jitters, and calculates, based on the angle, a distance for which a lens module needs to compensate, and allows the lens to cancel the jitter of the electronic device 100 through reverse motion, thereby implementing image stabilization. The gyro sensor 180B may also be used in navigation and a motion sensing game scenario.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall effect sensor. The electronic device 100 may detect an opening state or a closing state of a flip leather case by using the magnetic sensor 180D. In some embodiments, when the electronic device 100 is a clamshell phone, the electronic device 100 may detect an opening state or a closing state of a flip cover based on the magnetic sensor 180D, and further provide, based on a detected opening or closing state of a leather case or a detected opening or closing state of the flip cover, a feature such as automatic unlocking with a flip cover.

The acceleration sensor 180E may detect an acceleration value of the electronic device 100 all directions (generally in three axes). When the electronic device 100 is stationary, a magnitude and a direction of gravity may be detected. The acceleration sensor 180E may be further configured to recognize a posture of the electronic device, and is applied to an application such as switching between landscape orientation and portrait orientation or a pedometer.

The distance sensor 180F is configured to measure a distance. The electronic device 100 may measure a distance through infrared or laser. In some embodiments, in a shooting scenario, the electronic device 100 may measure a distance by using the distance sensor 180F, to implement quick focusing.

The optical proximity sensor 180G may include, for example, a light-emitting diode (LED) and an optical detector such as a photodiode. The light-emitting diode may be an infrared light emitting diode. The electronic device 100 may emit infrared light by using the light-emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that a user holds the electronic device 100 close to an ear for a call, so as to implement automatic screen-off to save power. The optical proximity sensor 180G may alternatively be used in a leather case mode or a pocket mode to automatically unlock or lock a screen.

The ambient light sensor 180L is configured to perceive ambient light brightness. The electronic device 100 may adaptively adjust a luminance of the display screen 194 according to the perceived ambient light brightness. The ambient light sensor 180L may be further configured to automatically adjust white balance during photo taking. The ambient light sensor 180L may further cooperate with the optical proximity sensor 180G to detect whether the electronic device 100 is in a pocket, so as to prevent an accidental touch.

The fingerprint sensor 180H is configured to collect a fingerprint. The electronic device 100 may implement fingerprint unlock, application lock accessing, fingerprint photographing, fingerprint-based call answering, and the like by using a feature of the collected fingerprint.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 reduces performance of a processor near the temperature sensor 180J, to reduce power consumption and implement heat protection. In some other embodiments, when the temperature is lower than another threshold, the electronic device 100 heats the battery 142, to avoid an abnormal shutdown of the electronic device 100 caused by a low temperature. In some other embodiments, when the temperature is lower than still another threshold, the electronic device 100 boosts an output voltage of the battery 142, to avoid an abnormal shutdown caused by a low temperature.

The touch sensor 180K is also referred to as a "touch panel". The touch sensor 180K may be disposed on the display screen 194. The touch sensor 180K and the display screen 194 form a touchscreen, which is also referred to as a "touchscreen". The touch sensor 180K is configured to detect a touch operation performed on or near the touch sensor 180K. The touch sensor may transmit the detected touch operation to the application processor, to determine a touch event type. The touch sensor 180K may provide a visual output related to the touch operation by using the display screen 194. In some other embodiments, the touch sensor 180K may be alternatively disposed on a surface of the electronic device 100, and is located on a position different from that of the display screen 194.

The bone conduction sensor 180M may obtain a vibration signal. In some embodiments, the bone conduction sensor 180M may obtain a vibration signal of a vibration bone of a human vocal-cord part. The bone conduction sensor 180M may alternatively contact a human pulse, and receive a blood pressure beating signal. In some embodiments, the bone conduction sensor 180M may be alternatively disposed in a headset, to form a bone conduction headset. The audio module 170 may parse out a voice signal based on the vibration signal of a vibration bone block of the vocal-cord part that is obtained by the bone conduction sensor 180M, to implement a voice function. The application processor may parse heart rate information based on the blood pressure pulse signal obtained by the bone conduction sensor 180M, to implement a heart rate detection function.

The button 190 includes a power button, a volume button, and the like. The button 190 may be a mechanical button, or a touch-type button. The electronic device 100 may receive a button input, and generate a button signal input related to user setting and function control of the electronic device 100.

The motor 191 may generate a vibration prompt. The motor 191 may be configured to provide a vibration prompt for an incoming call, and may be further configured to provide a touch vibration feedback. For example, touch operations performed on different applications (for example, photo taking and audio playing) may correspond to different vibration feedback effects. For touch operations performed on different regions of the display screen 194, the motor 191 may also correspond to different vibration feedback effects. Different application scenarios (for example, a time prompt, information receiving, an alarm clock, and a game) may also correspond to different vibration feedback effects. A touch vibration feedback effect may be further customized.

The indicator 192 may be an indicator light, may be configured to indicate a charging state or a battery change, or may be further configured to indicate a message, a missed call, a notification, or the like.

The SIM card interface 195 is configured to connect to a SIM card. The SIM card may be inserted into the SIM card interface 195 or plugged from the SIM card interface 195, to come into contact with or be separated from the electronic device 100. The electronic device 100 may support one or N SIM card interfaces. N is a positive integer greater than 1. The SIM card interface 195 can support a nano SIM card, a micro SIM card, a SIM card, and the like. A plurality of cards may all be inserted into the same SIM card interface 195. The plurality of cards may be of a same type or different types. The SIM card interface 195 may further be compatible with different types of SIM cards. The SIM card interface 195 may also be compatible with an external memory card. The electronic device 100 interacts with a network by using a SIM card, to implement functions such as a call and data communication. In some embodiments, the electronic device 100 uses an eSIM, that is, an embedded SIM card. The eSIM card may be embedded in the electronic device 100 and cannot be separated from the electronic device 100.

A software system of the electronic device 100 may use a layered architecture, an event-driven architecture, a microkernel architecture, a micro service architecture, or a cloud architecture. In this embodiment of the present invention, an Android system with a layered architecture is used as an example to illustrate a software structure of the electronic device 100.

Figure 16:
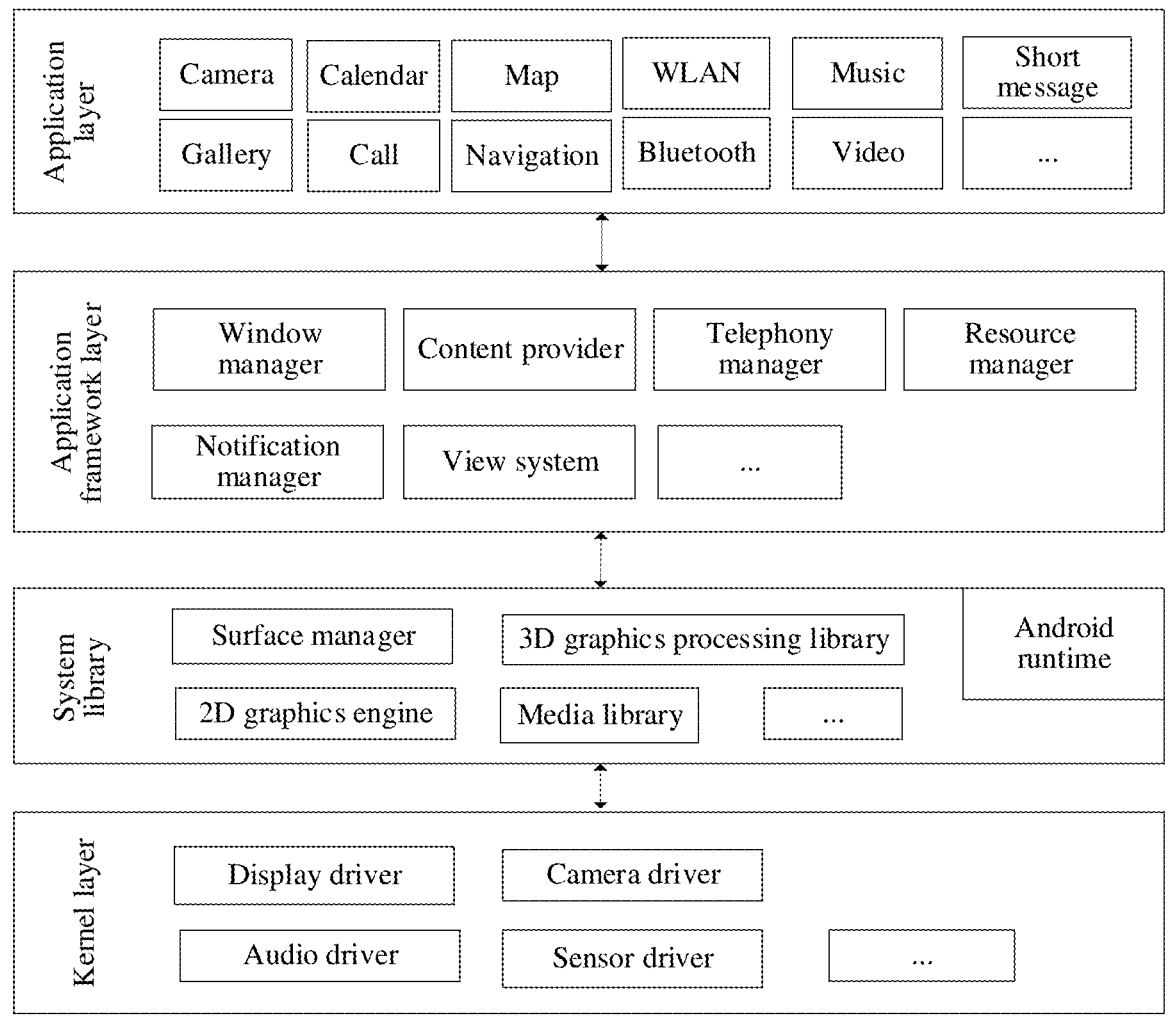
FIG. 16 is a block diagram of a software structure of an electronic device 100 according to an embodiment of this application.

FIG. 16 is a block diagram of a software structure of an electronic device 100 according to an embodiment of this application.

In the layered architecture, software is divided into several layers, and each layer has a clear role and task. Layers communicate with each other through a software interface. In some embodiments, the Android system is divided into four layers that are respectively an application layer, an application framework layer, an Android runtime (Android runtime) and system library, and a kernel layer from top to bottom.

The application layer may include a series of application packages.

As shown in FIG. 16, the application packages may include applications such as camera, gallery, calendar, phone, maps, navigation, WLAN, Bluetooth, music, videos, and SMS messages.

The application framework layer provides an application programming interface (application programming interface, API) and a programming framework for the applications at the application layer. The application framework layer includes some predefined functions.

As shown in FIG. 16, the application framework layer may include a window manager, a content provider, a view system, a phone manager, a resource manager, a notification manager, and the like.

The window manager is configured to manage a window application. The window manager may obtain a size of a display screen, determine whether there is a status bar, lock a screen, capture a screen, and the like.

The content provider is configured to store and obtain data, so that the data can be accessed by an application. The data may include a video, an image, an audio, calls made and answered, a browsing history and bookmarks, an address book, and the like.

The view system includes a visual control such as a control for text display or a control for picture display. The view system may be configured to construct an application. A display interface may be formed by one or more views. For example, a display interface including an SMS notification icon may include a view for displaying text and a view for displaying a picture.

The phone manager is configured to provide a communication function of the electronic device 100, for example, call state management (including getting through, hang-up, and the like).

The resource manager provides various resources for an application, for example, a localized character string, an icon, a picture, a layout file, and a video file.

The notification manager enables an application to display notification information on a status bar. The notification information may be a message used for indicating a notification type, and may automatically disappear after a short stay without interacting with a user. For example, the notification manager is configured to notify download completion, a message prompt, and the like. The notification manager may alternatively be a notification that appears on a top status bar of the system in a form of a graph or a scroll bar text, for example, a notification of an application running on the background, or may be a notification that appears on the screen in a form of a dialog window. For example, text information is prompted on a status bar, a prompt tone is made, the electronic device vibrates, or an indicator light flashes.

The Android Runtime includes a kernel library and a virtual machine. The Android runtime is responsible for scheduling and managing the Android system.

The kernel library includes two parts: One part is a performance function that the Java language needs to invoke, and the other part is a kernel library of Android.

The application layer and the application framework layer run on the virtual machine. The virtual machine executes Java files of the application layer and the application framework layer as binary files. The virtual machine is configured to execute functions such as object lifecycle management, stack management, thread management, security and exception management, and garbage collection.

The system library may include a plurality of function modules, such as a surface manager (surface manager), a media library (media libraries), a three-dimensional graphics processing library (for example, OpenGL ES), and a 2D graphics engine (for example, SGL).

The surface manager is configured to manage a display subsystem, and converge 2D and 3D layers of a plurality of applications.

The media library supports playback and recording of a plurality of common audio and video formats, a static image file, and the like. The media library may support a plurality of audio and video encoding formats, for example, MPEG 4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawings.

The kernel layer is a layer between hardware and software. The kernel layer includes at least a display driver, a camera driver, an audio driver, and a sensor driver.

The following illustrates working processes of software and hardware of the electronic device 100 with reference to an image capturing or photographing scenario.

When the touch sensor 180K receives a touch operation, a corresponding hardware interrupt is sent to the kernel layer. The kernel layer processes the touch operation into an original input event (including information such as coordinates of a touch and a time stamp of the touch operation). The original input event is stored at the kernel layer. The application framework layer obtains the original input event from the kernel layer, and recognizes a control corresponding to the input event. Using an example in which the touch operation is a touch/click operation, and a control corresponding to the click operation is a control of a camera application icon. The camera application invokes an interface of the application framework layer to start a camera application, then starts a camera driver by invoking the kernel layer, and captures a static image or a video by using the camera 193.

As used in the foregoing embodiments, based on the context, the term "when" may be interpreted as a meaning of "if", "after", "in response to determining . . . ", or "in response to detecting . . . ". Similarly, based on the context, the phrase "if determining" or "if detecting (a stated condition or event)" may be interpreted as a meaning of "when determining . . . ", "in response to determining . . . ", "when detecting (a stated condition or event)", or "in response to detecting . . . (a stated condition or event)".

All or some of the foregoing embodiments may be implemented by using software, hardware, firmware, or any combination thereof. When software is used for implementation, implementation may be entirely or partially performed in the form of a computer program product. The computer program product includes one or more computer instructions. When the computer program instructions are loaded and executed on a computer, all or some of the processes or functions according to the embodiments of this application are produced. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium that can be accessed by the computer, or a data storage device, such as a server or a data center in which one or more usable mediums are integrated. The usable medium may be a magnetic medium (for example, a soft disk, a hard disk, or a magnetic tape), an optical medium (for example, a DVD), a semiconductor medium (for example, an SSD), or the like.

A person of ordinary skill in the art may understand that all or some of the procedures in the methods in the embodiments may be implemented by using a computer program instructing relevant hardware. The program may be stored in a computer-readable storage medium. When the program is executed, the procedures in the foregoing method embodiments may be performed. The foregoing storage medium includes: any medium that can store program code, such as a ROM, a random access memory RAM, a magnetic disk, or an optical disc.

What is claimed is:

1. An image selection method, comprising:
   detecting, by an electronic device, first feedback information, the first feedback information comprising a plurality of images and a user operation acting on an image in the plurality of images;
   adjusting, by the electronic device, parameters of a decision model according to the first feedback information to obtain an updated decision model, wherein the decision model is an algorithm model configured to select an optimal image from multiple images obtained through continuous shooting, and the decision model includes one or more image features, each of the one or more image features being associated with one or more scores used for scoring the image feature in an image, and a weight being specified for each of the one or more image features; and
   selecting, by the electronic device, a first image from a first image group as the optimal image of the first image group according to the updated decision model,
   wherein the first feedback information comprises a first facial feature and a proportion of images comprising the first facial feature in a gallery,
   the first facial feature being a facial feature corresponding to the largest quantity of images in the gallery that comprise the facial feature, and the gallery comprising images stored in the electronic device,
   wherein the adjusting, by the electronic device, parameters of a decision model according to the first feedback information to obtain an updated decision model comprising:
   increasing, by the electronic device, the weight of a facial expression score of the first facial feature in the decision model, the one or more image features in the decision model comprising one or more facial features, the one or more facial features comprising the first facial feature,
   wherein the facial expression score is used for scoring an expression of the first facial feature of an image, and a greater weight of a facial feature indicates a greater probability that an image including the facial feature is selected as the optimal image.

2. The method according to claim 1, wherein before the detecting, by an electronic device, first feedback information, the method further comprises:
- displaying, by the electronic device, a first user interface, the first user interface comprising a second image group, the second image group being images obtained through continuous shooting and comprising a second image and a third image, the second image being an optimal image of the second image group selected by the electronic device according to the decision model;
- the detecting, by an electronic device, first feedback information comprises:
- detecting, by the electronic device, a first user operation on the first user interface, and changing, by the electronic device, the optimal image of the second image group to the third image in response to the first user operation; and
- the first feedback information comprises the first user operation, the second image, and the third image.

3. The method according to claim 1, wherein the first feedback information comprises an operation record of an image in a gallery and the image corresponding to the operation record, and the operation record indicates one or more of the following operations: a delete operation, a browse operation, an adding-to-favorites operation, and a sharing operation.

4. The method according to claim 1, wherein the adjusting, by the electronic device, parameters of a decision model according to the first feedback information to obtain an updated decision model comprising:
- increasing, by the electronic device, a weight of a portrait body proportion score of the first facial feature in the decision model, the portrait body proportion score being used for scoring a body proportion of a facial feature in an image, images in the first image group each comprising one or more facial features, the one or more facial features comprising the first facial feature.

5. The method according to claim 1, wherein before the selecting, by the electronic device, a first image from a first image group as an optimal image of the first image group according to the updated decision model, the method further comprises:
- displaying, by the electronic device, a camera application interface, the camera application interface comprising a photographing control; and
- performing, by the electronic device in response to a second user operation acting on the photographing control, continuous shooting to obtain the first image group; and
- after the selecting, by the electronic device, a first image from a first image group as an optimal image of the first image group according to the updated decision model, the method further comprises:
- displaying, by the electronic device, a continuous shooting image interface in response to a third user operation used for displaying the first image group, the continuous shooting image interface comprising the first image and thumbnails of the images in the first image group.

6. The method according to claim 1, wherein before the selecting, by the electronic device, a first image from a first image group as an optimal image of the first image group according to the updated decision model, the method further comprises:
- detecting, by the electronic device, the first image group from a gallery, thumbnails of the first image group being displayed adjacently in a gallery application interface, each of the images in the first image group comprising a first image feature, the first image feature comprising a second facial feature or a first shooting scene; and
- after the selecting, by the electronic device, a first image from a first image group as an optimal image of the first image group according to the updated decision model, the method further comprises:
- displaying, by the electronic device, the gallery application interface in response to a fourth user operation acting on a gallery icon, the gallery application interface comprising the thumbnails of the images in the first image group, and a size of a thumbnail of the first image being greater than a size of a thumbnail of any other image in the first image group.

7. The method according to claim 1, wherein before the selecting, by the electronic device, a first image from a first image group as an optimal image of the first image group according to the updated decision model, the method further comprises:
- displaying, by the electronic device, a second user interface, the second user interface comprising a plurality of image feature options and a determining control, each of the plurality of image feature options being corresponding to an image feature;
- displaying, by the electronic device, a first option from an unselected state to a selected state in response to a fifth user operation acting on the first option, the plurality of image feature options comprising the first option; and
- adjusting, by the electronic device, the parameters of the decision model according to an image feature corresponding to the first option in response to a sixth user operation acting on the determining control, to obtain the updated decision model.

8. An electronic device, comprising one or more processor, a memory, and a display screen, the memory being coupled to the one or more processors, the memory being configured to store computer program code comprising computer instructions, and the one or more processors invoking the computer instructions to cause the electronic device to perform operations comprising:
- detecting first feedback information, the first feedback information comprising a plurality of images and a user operation acting on an image in the plurality of images;
- adjusting parameters of a decision model according to the first feedback information to obtain an updated decision model, wherein the decision model is an algorithm model configured to select an optimal image from multiple images obtained through continuous shooting, and the decision model includes one or more image features, each of the one or more image features being associated with one or more scores used for scoring the image feature in an image, and a weight being specified for each of the one or more image features; and
- selecting a first image from a first image group as the optimal image of the first image group according to the updated decision model,
- wherein the first feedback information comprises a first facial feature and a proportion of images comprising the first facial feature in a gallery,
- the first facial feature being a facial feature corresponding to the largest quantity of images in the gallery that comprise the facial feature, and the gallery comprising images stored in the electronic device,
- wherein the one or more processors are further configured to invoke the computer instructions to cause the electronic device to perform operations comprising:

increasing the weight of a facial expression score of the first facial feature in the decision model, the one or more image features in the decision model comprising one or more facial features, the one or more facial features comprising the first facial feature, wherein the facial expression score is used for scoring an expression of the first facial feature of an image, and a greater weight of a facial feature indicates a greater probability that an image including the facial feature is selected as the optimal image.

9. The electronic device according to claim 8, wherein the one or more processors are further configured to invoke the computer instructions to cause the electronic device to perform operations comprising:

displaying a first user interface, the first user interface comprising a second image group, the second image group being images obtained through continuous shooting and comprising a second image and a third image, the second image being an optimal image of the second image group selected by the electronic device according to the decision model;

the one or more processors are further configured to invoke the computer instructions to cause the electronic device to perform operations comprising:

detecting a first user operation on the first user interface, and changing the optimal image of the second image group to the third image in response to the first user operation; and the first feedback information comprises the first user operation, the second image, and the third image.

10. The electronic device according to claim 8, wherein the first feedback information comprises an operation record of an image in a gallery and the image corresponding to the operation record, and the operation record indicates one or more of the following operations: a delete operation, a browse operation, an adding-to-favorites operation, and a sharing operation.

11. The electronic device according to claim 8, wherein the one or more processors are further configured to invoke the computer instructions to cause the electronic device to perform operations comprising:

increasing a weight of a portrait body proportion score of the first facial feature in the decision model, the portrait body proportion score being used for scoring a body proportion of a facial feature in an image, images in the first image group each comprising one or more facial features, the one or more facial features comprising the first facial feature.

12. The electronic device according to claim 8, wherein the one or more processors are further configured to invoke the computer instructions to cause the electronic device to perform operations comprising:

displaying a camera application interface, the camera application interface comprising a photographing control; and performing continuous shooting in response to a second user operation acting on the photographing control, to obtain the first image group; and displaying a continuous shooting image interface in response to a third user operation used for displaying the first image group, the continuous shooting image interface comprising the first image and thumbnails of the images in the first image group.

13. The electronic device according to claim 8, wherein the one or more processors are further configured to invoke the computer instructions to cause the electronic device to perform operations comprising:

detecting the first image group from a gallery, thumbnails of the first image group being displayed adjacently in a gallery application interface, each of the images in the first image group comprising a first image feature, the first image feature comprising a second facial feature or a first shooting scene; and the one or more processors are further configured to invoke the computer instructions to cause the electronic device to perform operations comprising:

displaying the gallery application interface in response to a fourth user operation acting on a gallery icon, the gallery application interface comprising the thumbnails of the images in the first image group, and a size of a thumbnail of the first image being greater than a size of a thumbnail of any other image in the first image group.

14. The electronic device according to claim 8, wherein the one or more processors are further configured to invoke the computer instructions to cause the electronic device to perform operations comprising:

displaying a second user interface, the second user interface comprising a plurality of image feature options and a determining control, each of the plurality of image feature options being corresponding to an image feature;

displaying a first option from an unselected state to a selected state in response to a fifth user operation acting on the first option, the plurality of image feature options comprising the first option; and adjusting the parameters of the decision model according to an image feature corresponding to the first option in response to a sixth user operation acting on the determining control, to obtain the updated decision model.

15. The method according to claim 1, wherein the first feedback information comprises a first image feature and a proportion of images comprising the first image feature in a gallery, the first image feature corresponding to the largest quantity of images in the gallery that comprise the first image feature, and the gallery comprising images stored in the electronic device; and wherein the adjusting, by the electronic device, parameters of a decision model according to the first feedback information to obtain an updated decision model comprising:

increasing, by the electronic device, a weight of a score of the first image feature in the decision model, images in the first image group each comprising one or more image features, the one or more image features comprising the first image feature.

* * * * *

UNITED STATES PATENT AND TRADEMARK OFFICE
CERTIFICATE OF CORRECTION

PATENT NO. : 12,200,345 B2  
APPLICATION NO. : 17/764391  
DATED : January 14, 2025  
INVENTOR(S) : Yanhua Chen et al.

Page 1 of 1

It is certified that error appears in the above-identified patent and that said Letters Patent is hereby corrected as shown below:

On the Title Page

Change "(71) Applicant: HONOR DEVICE CO., LTD., Guangdong (CN)" to --(71) Applicant: HONOR DEVICE CO., LTD., Shenzhen (CN)--;

In the Claims

Column 46, Claim 8, Lines 35 and 36, change "processor" to --processors--; and

Column 47, Claim 8, Line 10, change "as the optical image" to --as an optical image--.

Signed and Sealed this  
Eleventh Day of February, 2025

Coke Morgan Stewart  
*Acting Director of the United States Patent and Trademark Office*